US007502718B2

(12) United States Patent
Kanamaru

(10) Patent No.: US 7,502,718 B2
(45) Date of Patent: Mar. 10, 2009

(54) VEHICLE FAULT DIAGNOSTIC SYSTEM

(75) Inventor: Masanobu Kanamaru, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 190 days.

(21) Appl. No.: 10/541,214

(22) PCT Filed: Nov. 11, 2004

(86) PCT No.: PCT/JP2004/017133

§ 371 (c)(1), (2), (4) Date: Jun. 30, 2005

(87) PCT Pub. No.: WO2005/054021

PCT Pub. Date: Jun. 16, 2005

(65) Prior Publication Data

US 2006/0025966 A1 Feb. 2, 2006

(30) Foreign Application Priority Data

Dec. 3, 2003 (JP) ............................ 2003-405106
Jun. 10, 2004 (JP) ............................ 2004-172318

(51) Int. Cl.
*G06F 11/30* (2006.01)

(52) U.S. Cl. ........................................ 702/184; 701/29

(58) Field of Classification Search ............. 702/33-36, 702/58-59, 182-185, 188; 714/2, 25, 48-49; 701/29-30, 32-35
See application file for complete search history.

(56) References Cited

U.S. PATENT DOCUMENTS 5,400,018 A 3/1995 Scholl et al.
5,541,840 A * 7/1996 Gurne et al. .................. 701/33
6,212,449 B1 * 4/2001 Wellman et al. .............. 701/29
6,256,594 B1 7/2001 Yamamoto et al.
6,330,499 B1 * 12/2001 Chou et al. ................... 701/33
6,370,455 B1 * 4/2002 Larson et al. ................. 701/33
6,389,335 B1 5/2002 Vos
6,429,773 B1 * 8/2002 Schuyler .................. 340/425.5
6,580,983 B2 * 6/2003 Laguer-Diaz et al. ......... 701/35
6,745,151 B2 * 6/2004 Marko et al. ................ 702/182
6,768,935 B1 * 7/2004 Morgan et al. ................ 701/29
6,892,317 B1 * 5/2005 Sampath et al. ................ 714/4
7,231,757 B2 * 6/2007 Poulson et al. ................ 56/249

FOREIGN PATENT DOCUMENTS

JP A 2001-342890 12/2001
JP A 2002-059834 2/2002
JP A 2002-59834 2/2002

(Continued)

*Primary Examiner*—Hal D Wachsman
*Assistant Examiner*—Mary C Baran
(74) *Attorney, Agent, or Firm*—Oliff & Berridge, PLC

(57) ABSTRACT

Vehicle data detected in a vehicle 10 is transmitted to an information center 12 so as to detect a fault. When detecting generation of the fault, the information center 12 instructs the vehicle to perform a fault identification process. Identification of the fault location is performed while using mutual communication. When the detected fault is one that requires a recovery countermeasure, the information center 12 instructs the vehicle to perform a recovery process. The recovery process is performed while using mutual data communication so as to eliminate the influence of the fault.

10 Claims, 10 Drawing Sheets

FOREIGN PATENT DOCUMENTS

| | | |
|---|---|---|
| JP | A 2002-73153 | 3/2002 |
| JP | A 2002-202003 | 7/2002 |
| JP | A 2002-250248 | 9/2002 |
| JP | A 2002-334168 | 11/2002 |
| JP | A 2003-170817 | 6/2003 |

* cited by examiner

VEHICLE FAULT DIAGNOSTIC SYSTEM

TECHNICAL FIELD

The present invention relates to a vehicle fault diagnostic system, and more particularly to a vehicle fault diagnostic system including a vehicle and an information center that are capable of communicating with each other.

BACKGROUND ART

A known conventional system disclosed, for instance, by Japanese Patent Laid-Open No. 2002-73153 diagnoses a vehicle condition within the vehicle and, if it is anticipated that a fault may occur, transmits relevant information to a servicing institution via a communication device. Before the vehicle becomes unable to run on a road, the conventional system makes it possible to avoid an inconvenience, which may arise out of a vehicle fault, by prompting an user to take emergency countermeasures or to bring the vehicle into a servicing institution.

However, the above conventional system finishes a vehicle fault diagnosis within a vehicle, and communicates with an external institution only when it transmits fault diagnosis results. As such being the case, the above conventional system needs to store the whole information necessary for fault diagnostic processing within the vehicle.

Further, if a fault occurs to affect the vehicle's run, the above conventional system supplies information to an external institution even if the severity of the fault is low. When the intended purpose is to prevent the vehicle from becoming disabled, the vehicle does not always have to transmit the information to an external if the severity of the fault is low and does not immediately disable the vehicle. In this respect, the above conventional system unnecessarily increases the load on a vehicle's information process.

The present invention has been made in view of the above circumstances. It is an object of the present invention to provide a vehicle fault diagnostic system that is capable of taking early countermeasures against a vehicle fault and reduces information processing load on the vehicle by establishing communication between the vehicle and an external institution.

Japanese Patent Laid-Open No. 2002-202003 discloses a system that chronologically stores information regarding to learning values which are outside a specified range, evaluates the stored information, and notifies the user of a fault that is about to occur. The above document also discloses a technology for transmitting relevant data to a vehicle dealer to prompt for early response.

Further, Japanese Patent Laid-Open No. 2002-250248 discloses a system that exercises recovery control to inhibit the abnormality from spreading or expanding not only reports the abnormality when any abnormality is diagnosed.

DISCLOSURE OF INVENTION

The above object is achieved by a vehicle fault diagnostic system, which includes a vehicle and an information center that are capable of communicating with each other and has features described as follows. The system includes vehicle data detection means that is installed in the vehicle to detect vehicle data; fault detection means that is installed in the vehicle or in the information center to detect a vehicle fault in accordance with said vehicle data; identification process instruction means that is installed in the information center to find arising of the vehicle fault and to instruct the vehicle to perform a fault identification process for identifying the cause of the vehicle fault; identification process execution means that is installed in the vehicle to perform the fault identification process that is instructed; identification process result return means that is installed in the vehicle to return the result of said fault identification process to the information center; fault location identification means that is installed in the information center to identify the fault location in accordance with the result of said fault identification process, which is returned from the vehicle; and identified fault countermeasure means that is installed in the information center to take countermeasures against the identified fault.

The above object is also achieved by a vehicle fault diagnostic system, which includes a vehicle and an information center that are capable of communicating with each other and has features described as follows. The system includes vehicle data detection means that is installed in the vehicle to detect vehicle data; fault detection means that is installed in the vehicle or in the information center to detect a vehicle fault in accordance with said vehicle data; recovery process instruction means that is installed in the information center to find arising of the vehicle fault and to instruct the vehicle to perform a recovery process for eliminating the influence of the vehicle fault; recovery process execution means that is installed in the vehicle to perform the recovery process that is instructed; and process determination means that is installed in the vehicle or in the information center to determine in accordance with the result of said recovery process whether another recovery process should be continued or not.

The above object is further achieved by a vehicle fault diagnostic system, which includes a vehicle and an information center that are capable of communicating with each other and has features described as follows. The system includes fault characteristic value detection means that is installed in the vehicle to detect a fault characteristic value stemming from arising of a particular fault; fault seriousness determining means for determining the serious degree of detected said fault in accordance with the magnitude of said fault characteristic value; and supply information limiting means for supplying the detected information about said fault to the information center only when said serious degree exceeds a judgment value.

BEST MODE FOR CARRYING OUT THE INVENTION

First Embodiment

Configuration of First Embodiment

Figure 1:
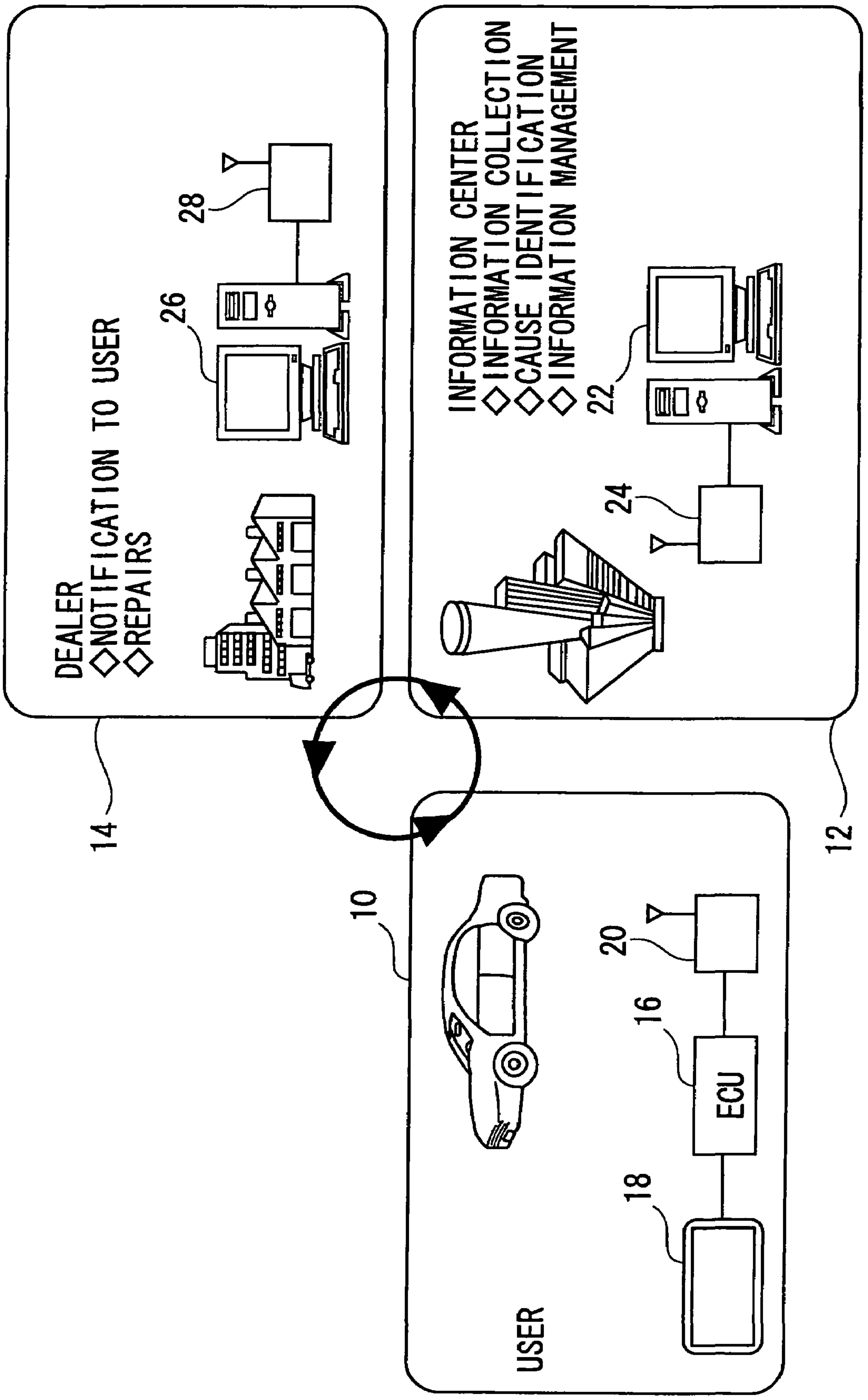
FIG. 1 is a conceptual diagram illustrating the configuration of a first embodiment of the present invention.

FIG. 1 is a conceptual diagram illustrating the configuration of a first embodiment of the present invention. As shown in FIG. 1, a system according to the first embodiment includes a vehicle 10, which is used by a user, an information center 12, and a dealer 14, which doubles as a vehicle servicing institution. As described later, these three can communicate information to each other via communication devices.

The vehicle 10 includes an ECU (Electronic Control Unit) 16, a display 18, and a communication device 20. The ECU 16 is a unit for controlling the status of the vehicle 10. It can read vehicle data from various on-vehicle sensors and drive various on-vehicle actuators.

The ECU 16 is connected to the display 18 that is mounted within a vehicle compartment. The display 18 not only presents various information to a vehicle driver/passenger, but also serves as an interface for allowing the vehicle driver/passenger to enter information. The ECU 16 is also connected to the communication device 20. The ECU 16 can exchange information with devices installed at the information center 12 and dealer 14 via the communication device 20.

A computer system 22 and a communication device 24 are installed at the information center 12. Similarly, a computer system 26 and a communication device 28 are installed at the dealer 14 as well. These computer systems 22, 26 can exchange information with each other and with the vehicle 10 via the communication devices 24, 28.

Concept of Fault Diagnosis According to First Embodiment

When recognizing failures or defects that exist in the vehicle 10, the system according to the present embodiment classifies them into three different levels. Faults or defects whose importance and urgency is the lowest are hereinafter referred to as “Level 1 faults or defects;” faults or defects are referred to as “Level 2 faults or defects” or “Level 3 faults or defects” as importance and urgency thereof become higher.

(Level 1 Faults or Defects)

In the present embodiment, vehicle maintenance information is classified as Level 1. More specifically, oil deterioration, oil insufficiency, low tire air pressure, necessity for tire replacement, low air-conditioner gas pressure, inadequate battery function, engine coolant shortage, washer shortage, lamp illumination failure, and other similar faults or defects are classified as Level 1. When a Level 1 failure or defect occurs, an on-vehicle process is performed, for instance, to illuminate a warning lamp. In this instance, a fault diagnostic process is completed within the vehicle.

(Level 2 Faults or Defects)

For example, abnormal shock within the vehicle and inadequate fuel efficiency are classified as Level 2 faults or defects. Abnormal shock can be detected, for instance, by an on-vehicle acceleration sensor. Inadequate fuel efficiency can be detected by comparing the fuel consumption amount prevailing under fixed reference conditions (e.g., during idling or 40 km/h constant speed running) against a reference value.

The above faults do not bring the vehicle to an immediate stop. However, it is conceivable that the above faults may be caused by any abnormality, and are likely to bring discomfort to the passengers in the vehicle, unlike Level 1 faults or the like. Therefore, when a Level 2 failure or defect is detected, the system according to the present embodiment attempts to identify the cause of the detected faults or defects and supplies the resulting identification information to the dealer 14, thereby making it possible to take early countermeasures against the detected fault or defect. When identifying the faults, the system according to the present embodiment causes the information center 12 to perform a part of an identification process for the purpose of reducing the load on the ECU 10 while allowing the ECU 10 and information center 12 to exchange information.

(Level 3 Faults or Defects)

In the present embodiment, faults or defects directly bringing the vehicle to a stop are classified as Level 3. More specifically, an abnormal engine speed Ne decrease, acceleration failure, abnormal sound, abnormal knock, pre-ignition, and other ones that are the signs of an engine stall are classified as Level 3. The abnormal engine speed Ne decrease can be detected in accordance, for instance, with a revolution speed sensor output generated during idling. The acceleration failure can be detected by checking whether proper acceleration is achieved when the throttle opening or intake air amount increases.

An abnormal sound can be detected in accordance, for instance, with the output of a microphone installed within an engine room. More specifically, the place where an abnormal sound is generated, that is, the source of the abnormal sound, can be located by subjecting the microphone output to frequency analysis and pattern recognition. When an abnormal sound having a high sound pressure is generated in an internal combustion engine main body or other component important for a vehicle run, the present embodiment recognizes the abnormal sound as a Level 3 failure or defect.

An abnormal knock can be detected by a vibration sensor or cylinder pressure sensor. Pre-ignition can be detected by a cylinder pressure sensor or by making an ion current comparison between combustion start timing and ignition plug discharge timing.

The above abnormalities can be detected as a sign that the vehicle is about to become unable to run. When a Level 3 faults or defect is detected in the vehicle, it is preferred that the cause of the fault or defect be identified immediately to perform proper maintenance. When it is required to transport the vehicle 10 to the dealer 14, it is preferred that the vehicle 10 be able to run wherever possible. Therefore, when a Level 3 failure or defect is detected, the system according to the present embodiment attempts to identify the cause of the fault or defect, supplies the resulting identification information to the dealer 14, and performs a recovery procedure within the vehicle 10 for deleting the effect of the fault or defect. When identifying the faults or defect and performing the recovery procedure, the system according to the present embodiment causes the information center 12 to perform a part of a necessary process for the purpose of reducing the load on the ECU 10 while allowing the ECU 10 and information center 12 to exchange information.

(Roles of Vehicle 10, Information Center 12, and Dealer 14)

Figure 2:
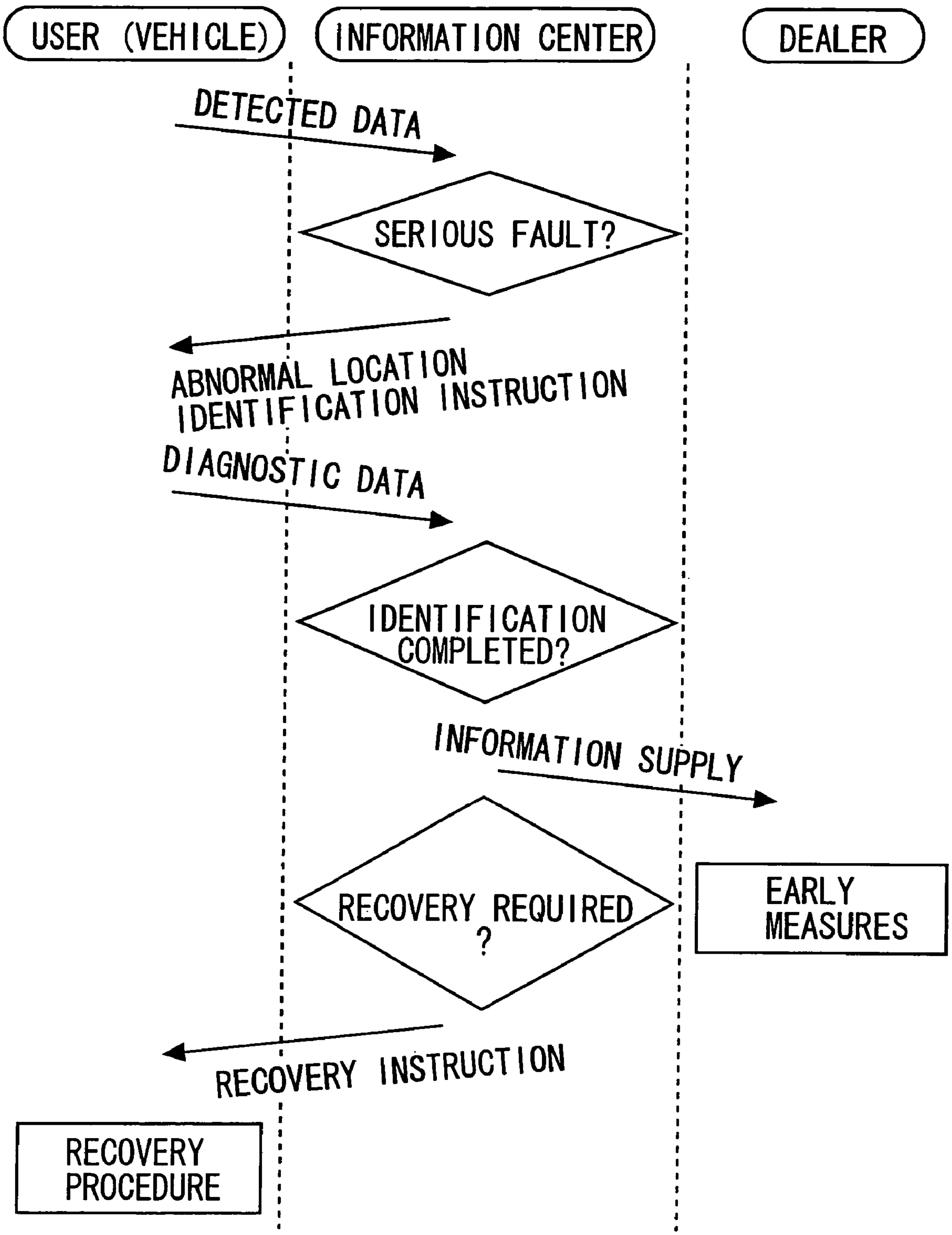
FIG. 2 illustrates a fault diagnostic scheme that is carried out in the event of a Level 2 and Level 3 fault or defect.

FIG. 2 outlines a fault diagnostic scheme that is carried out in the event of a Level 2 or Level 3 faults or defect. The fault diagnostic process for a Level 1 fault or defect will not be described in detail below because it is completed in the vehicle 10 without involving particular functions of the information center 12 and dealer 14.

In the vehicle 10, various vehicle data, which are closely related to Level 2 and Level 3 faults or defects, are detected. For example, the fuel injection time and fuel injection rate for calculating the fuel consumption amount (fundamental data for a Level 2 fuel efficiency problem), the engine speed for judging an engine stall (Level 3), and the cylinder pressure sensor output for judging an abnormal knock (Level 3) and pre-ignition (Level 3) are detected with predetermined sampling timing. These vehicle data are transmitted from the vehicle 10 to the information center 12 as shown in FIG. 2.

The information center 12 receives the vehicle data from the vehicle 10, and analyzes the vehicle data to check for a serious abnormality, that is, a Level 2 or Level 3 fault or defect. For example, the information center 12 judges whether the fuel consumption amount is significantly increased with the passage of time, whether the engine speed Ne is abnormally decreased, and whether cylinder pressure change according to an abnormal knock or pre-ignition is detected by the cylinder pressure sensor.

If no serious abnormality is recognized at the information center 12, the vehicle 10 repeatedly transmits vehicle data to the information center 12. If, on the other hand, a serious abnormality is recognized at the information center 12, the information center 12 instructs the vehicle 10 to identify the cause of the abnormality, that is, a fault. If, for instance, the engine speed Ne is abnormally decreased, the vehicle 10 is requested to perform a predefined specific process for the purpose of determining whether the abnormality is caused by a friction increase in the internal combustion engine or in some auxiliary devices.

The vehicle 10 performs a designated specific process and then transmits vehicle data as diagnostics data, which is generated as a result of the process, to the information center 12. In a mode for diagnosing the increase in the internal combustion engine friction, for instance, a combination of intake air amount Ga and engine speed Ne is transmitted to the information center. In a mode for diagnosing the increase in the friction of each auxiliary device, a combination of the air intake amounts Ga and engine speeds Ne prevailing before the auxiliary device operation as well as the same prevailing after the auxiliary device operation are transmitted to the information center 12.

In accordance with the vehicle data supplied from the vehicle 10, the information center 12 judges whether the fault, that is, the cause of the abnormality is identified. If the judgment result indicates that the fault is still not identified, the information center 12 issues instructions for making continued efforts to identify the fault. If, on the other hand, the judgment result indicates that the fault is identified, the information about the identified fault is supplied to the dealer 14. Upon receipt of the information, the dealer 14 takes early countermeasures against the fault. More specifically, the dealer 14 starts various actions such as contacting the user and procuring parts necessary for repairs of the vehicle 10.

When the fault is identified, the information center 12 judges whether the identified fault is a Level 3 fault or defect, which requires the execution of a recovery procedure. When the obtained judgment result indicates that the identified fault is a Level 3 fault or defect, the information center 12 instructs the vehicle 10 to perform a recovery procedure. More specifically, if the identified fault is an increase in the internal combustion engine friction, the information center 12 instructs the vehicle 10 to increase the amount of idling air. If, on the other hand, the identified fault is an increase in the friction of an auxiliary device, the information center 12 instructs the vehicle 10 to increase the amount of correction air for the operation of the auxiliary device. Further, if the identified fault is pre-ignition or other defect that cannot readily be recovered from within the vehicle 10, the user is instructed to immediately bring the vehicle 10 to the dealer for recovery purposes.

Details of Processing Steps According to First Embodiment (Overall Process)

Figure 3:
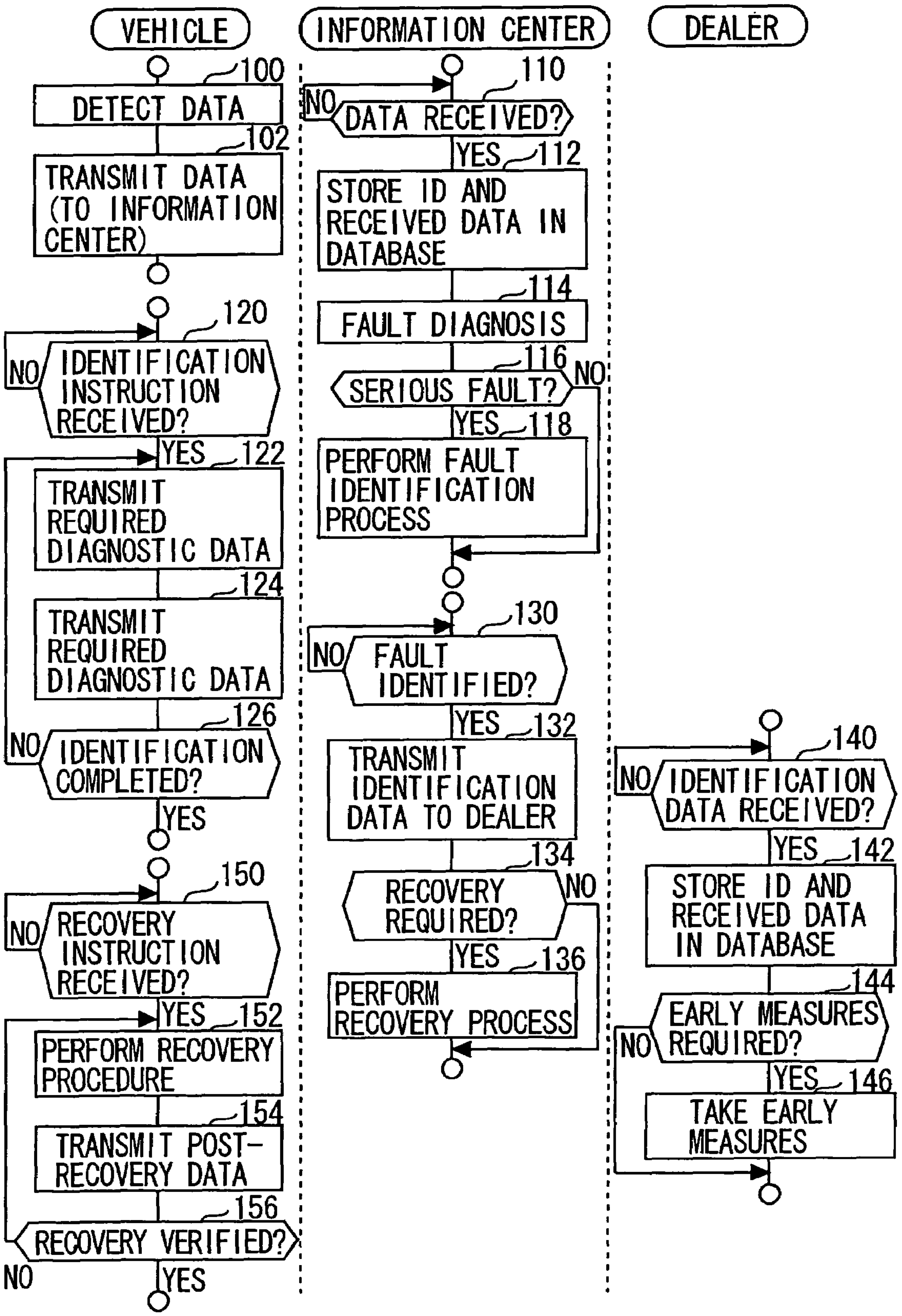
FIG. 3 is a flowchart illustrating processing steps that a vehicle, information center, and dealer respectively perform in compliance with the concept indicated in FIG. 2.

FIG. 3 is a flowchart illustrating processing steps that the vehicle 10, information center 12, and dealer 14 respectively perform in accordance with the above concept. As indicated in the flowchart, the ECU 16 in the vehicle 10 detects a large number of vehicle data concerning the status of the vehicle 10 (step 100). The vehicle data concerning Level 2 and Level 3 faults or defects are transmitted to the information center 12 (step 102).

In step 110, the information center 12 receives the data from the vehicle 10. The information center 12 then stores the received data in a database within the computer system 22 (step 112). More specifically, step 112 is performed to store not only the transmitted vehicle data but also the ID of the vehicle 10 that has transmitted the data. Next, a fault diagnosis is performed in the vehicle 10 in accordance with the received latest vehicle data and past vehicle data previously stored in the database (step 114). More specifically, the faults or defects classified to Level 2 and Level 3 are judged one by one whether arising or not.

After the above diagnostic check, judgment is made for checking whether a serious faults or defect, which belongs to Level 2 or 3 is found out or not (step 116). If no serious faults or defect is recognized, the computer system 22 at the information center 12 returns to a state in which vehicle data is awaited. If, on the other hand, a serious fault or defect is recognized, the information center 12 begins to perform a fault identification process (step 118).

When the fault identification process starts, the information center 12 first instructs the vehicle 10 to initiate an identification process. Next, the information center 12 selects the identification process to be performed. The information center 12 stores the relationship between detected faults or defects and identification processing steps for identifying the causes of detected faults or defects. The identification process to be performed is selected in accordance with the stored relationship. When a particular identification process is selected in this manner, the information center 12 informs the vehicle 10 of the first process to be performed for identification purposes and the vehicle data (hereinafter referred to as the "required diagnostic data") to be confirmed after completion of the first process.

The vehicle 10 receives an identification instruction from the information center 12 (step 120), and then begins to perform a process for acquiring the required diagnostic data (step 122). More specifically, the vehicle 10 performs a process that is designated by the information center 12, and acquires the resulting specific vehicle data as the required diagnostic data. In step 124, the vehicle 10 transmits the acquired required diagnostic data to the information center 12. Subsequently, the vehicle 10 repeatedly performs processing steps 122 until receiving an identification completion instruction (step 126).

If the vehicle 10 sends the required diagnostic data to the information center 12 while the fault identification process is being performed, the information center 12 notes the required diagnostic data to judge whether the fault is identified. If it is judged that any further process needs to be performed for fault identification, the information center 12 informs the vehicle 10 of the next process to be performed and the associated required diagnostic data. Upon receipt of such instructions from the information center 12, the vehicle 10 performs processing steps 122 and 124 to send the required diagnostic data to the information center 12.

When the information center 12 notes the received required diagnostic data to conclude that fault identification is completed, the information center 12 notifies the vehicle 10 of the completion of fault identification. Upon receipt of such a notification, the vehicle 10 judges that the condition of step 126 is established. As a result, the fault identification process terminates at both the information center 12 and vehicle 10. Further details of the fault identification process will be given later with reference to FIGS. 4 to 6.

When identifying the fault in the vehicle 10 (step 130), the information center 12 first transmits the information about the identified fault to the dealer 14 (step 132). Next, the information center 12 judge whether the identified fault is a Level 3 fault or defect, which requires the execution of a recovery procedure (step 134). When the obtained judgment result indicates that the execution of a recovery procedure is required, a recovery process is started immediately (step 136).

The dealer 14 waits until the information center 12 transmits identified fault data (step 140). Upon receipt of the identified fault data, the dealer 14 stores the ID of the vehicle 10 and the identified fault data in a database within the computer system 26 (step 142).

Next, judgment is made for checking whether the identified fault requires the execution of early countermeasures (step 144). If the judgment result indicates that the execution of early countermeasures is required, the dealer 14 contacts the user (via e-mail, etc.) and automatically places an advance order for replacement parts (step 146).

When the above recovery process (step 136) is initiated at the information center 12, the information center 12 first instructs the vehicle 10 to start performing a recovery process. Next, the information center 12 selects a particular recovery process that is to be performed. The information center 12 stores the relationship between the identified fault and the recovery process for eliminating the influence of the fault. The recovery process to be performed is selected in accordance with the stored relationship. When a particular recovery process is selected in this manner, the information center 12 notifies the vehicle 10 of the process to be executed for recovery purposes and the vehicle data (hereinafter referred to as the "recovery confirmation data") to be confirmed after completion of the recovery process.

When the information center 12 issues the above recovery instruction (step 150), the vehicle 10 performs a recovery procedure in compliance with the recovery instruction (step 152). Specific vehicle data generated after the execution of the recovery procedure is then acquired as the recovery confirmation data. The recovery confirmation data acquired in this manner is transmitted from the vehicle 10 to the information center 12 (step 154). Subsequently, the vehicle 10 repeatedly performs processing steps 152 until receiving a recovery confirmation instruction (step 156).

When the recovery confirmation data is transmitted from the vehicle 10 during recovery process execution, the information center 12 analyzes the data to judge whether the influence of the fault is eliminated. If the judgment result indicates that the influence of the fault is not eliminated, the information center 12 instructs the vehicle 10 to continuously perform a recovery procedure. Upon receipt of such an instruction, the vehicle 10 performs processing steps 152 and 154 to transmit the recovery confirmation data to the information center 12.

When the information center 12 notes the recovery confirmation data to recognize that the influence of the fault is eliminated, the information center 12 informs the vehicle 10 that recovery is confirmed. Upon receipt of such a notification, the vehicle 10 judges that the condition of step 156 is established. As a result, the recovery process terminates at both the information center 12 and vehicle 10. Further details of the recovery process will be given later with reference to FIG. 7.

(Typical Fault Identification Process)

Figure 4:
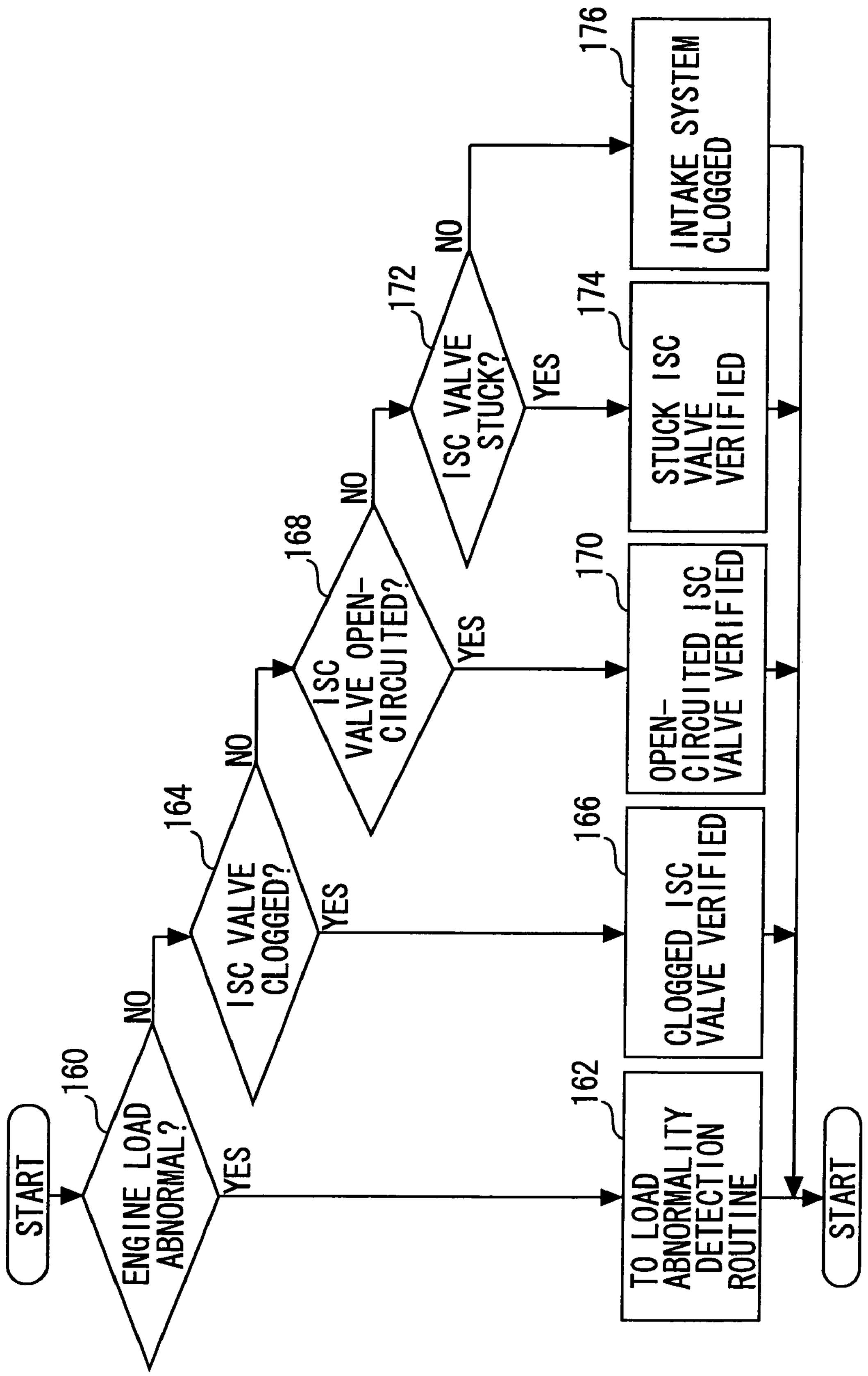
FIG. 4 is a flowchart illustrating a typical fault identification process that is performed at the information center.

FIG. 4 is a flowchart illustrating a typical fault identification process that is performed at the information center 12. The fault identification process shown in FIG. 4 relates to an abnormal decrease in the engine speed Ne. In the present embodiment, the internal combustion engine is set so that the engine speed Ne does not normally decrease below 400 rpm. Therefore, when an engine speed Ne of lower than 400 rpm is detected, the present embodiment concludes that the engine speed Ne is abnormally low. In this instance, the information center 12 performs a fault identification process by following the steps shown in FIG. 4 for the purpose of identifying the cause of the abnormality.

In the flowchart, although the abnormally low engine speed Ne is handled as a defect that directly leads to an engine stall, the defects directly lead to an engine stall is not limited to this. When, for instance, the cylinder pressure detected by the cylinder pressure sensor is unduly low or the internal combustion engine output torque detected by a torque sensor is unduly small, the present embodiment may recognize a defect that directly leads to an engine stall.

In the fault identification process shown in FIG. 4, an identification process for determining whether the engine load is abnormal is initiated at first (step 160). More specifically, the information center 12 requests the vehicle 10 to measure the intake air amount Ga (airflow meter; AFM measured air amount) and engine speed Ne under a reference load condition (while an air conditioner, an alternator, a power steering, and other auxiliary devises imposing a load (hereinafter referred to as the "auxiliary devices") are operating), and return the measured data (required diagnostic data).

Figure 5:
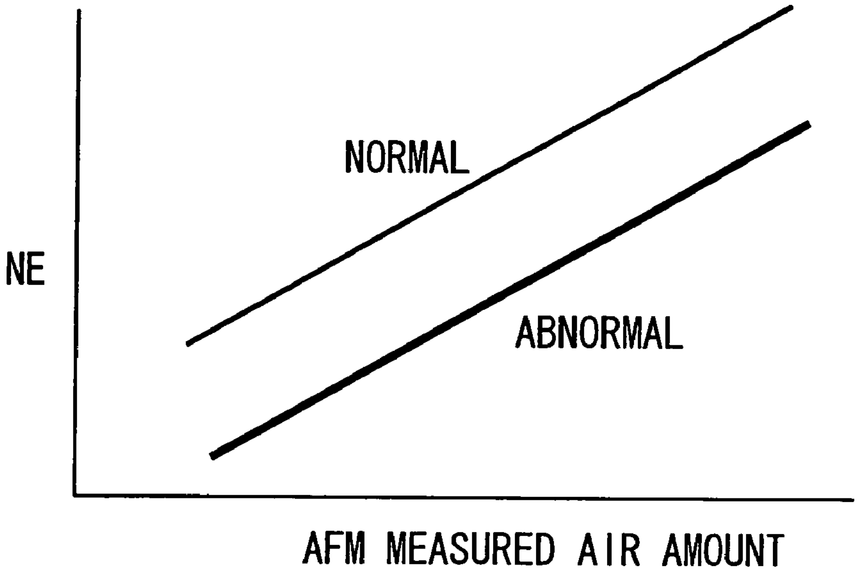
FIG. 5 illustrates the relationship between an AFM measured air amount Ga and engine speed Ne under a reference load condition.

FIG. 5 illustrates the relationship between the AFM measured air amount Ga and engine speed Ne under the reference load condition. While the load is constant, the engine speed Ne virtually depends on the AFM measured air amount Ga.

Therefore, the normal relationship between the AFM measured air amount Ga and engine speed Ne can be predefined as indicated in FIG. 5. If the Ne transmitted as the required diagnostic data is unduly small in relation to the Ga simultaneously transmitted, the information center 12 concludes that the internal combustion engine load is abnormal. In such an instance, a load abnormality detection routine is also started for the purpose of identifying the fault (step 162).

In the load abnormality detection routine, the information center 12 sequentially requests the vehicle 10 to forcibly drive or stop the auxiliary devices, one by one, while maintaining the air amount Ga constant, and return the engine speed change arising between after and before the start or stop of each auxiliary device to the information center 12 as the required diagnostic data. When the auxiliary devices individually start or stop, the internal combustion engine load changes, thereby changing the engine speed Ne. The information center 12 stores an engine speed change amount for each auxiliary device, and compares the engine speed change amount, which is transmitted as the required diagnostic data, against the stored value to judge whether the load on each auxiliary device is appropriate.

If an unduly great engine speed change amount is found in any auxiliary device, the information center 12 concludes that the auxiliary device is faulty. If, on the other hand, no fault is found in any auxiliary device, the information center 12 concludes that there is an undue friction increase in the internal combustion engine main body or a problem with a drive train. When the fault is located in this manner, the information center 12 issues an identification completion instruction to the vehicle 10 as described earlier so that the fault identification process ends. In addition, the information center 12 supplies the information about the identified fault to the user (vehicle 10) and dealer 14.

If the internal combustion engine load is not found to be abnormal when an identification process is performed in step 160, the information center 12 starts an identification process for checking whether an idle speed control valve (ISC valve) is clogged (step 164). More specifically, the information center 12 requests the vehicle 10 to measure an ISC control amount (valve opening degree or drive duty cycle) and AFM measured air amount Ga, and return the measured data (required diagnostic data) to the information center 12.

Figure 6:
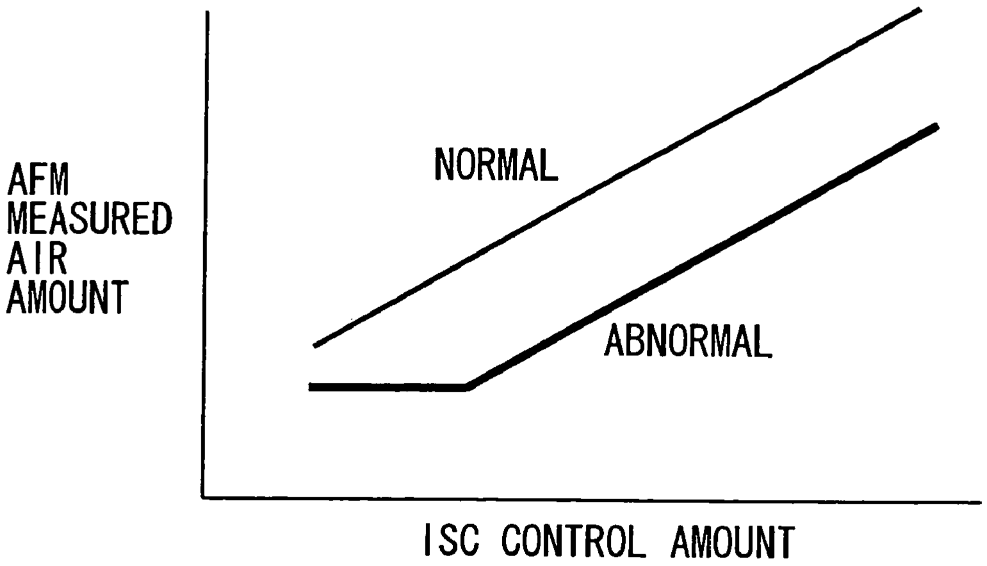
FIG. 6 illustrates the relationship between an ISC control amount and AFM measured air amount Ga.

FIG. 6 illustrates the relationship between the ISC control amount and AFM measured air amount Ga. Originally, the ISC control amount is virtually proportional to the AFM measured air amount Ga, their normal relationship, therefore, can be predefined as indicated in FIG. 6. If the AFM measured air amount Ga, which is returned as the required diagnostic data, is unduly small in relation to the ISC control amount, which is returned simultaneously, the information center 12 concludes that the ISC valve is clogged (step 166). When the fault is identified in this manner, the information center 12 issues an identification completion instruction to the vehicle 10 so that the fault identification process ends. In addition, the information center 12 notifies the user (vehicle 10) and dealer 14 of the ISC valve abnormality and the necessity for cleaning or replacing the ISC valve.

If the ISC valve is not found to be clogged when an identification process is performed in step 164, the information center 12 starts an identification process to check for an open circuit or short circuit in the ISC valve (step 168). More specifically, the information center 12 requests the vehicle 10 to measure an ISC valve terminal voltage and return the measured value to the information center 12 as the required diagnostic data.

If there is an open circuit or short circuit in a drive circuit for the ISC valve, the ISC valve terminal voltage is abnormal. If the terminal voltage returned as the required diagnostic data significantly differs from a predefined normal value, the information center 12 concludes that there is an open circuit or short circuit in the ISC valve (step 170). When the fault is identified in this manner, the information center 12 issues an identification completion instruction to the vehicle 10 so that the fault identification process ends. In addition, the information center 12 notifies the user (vehicle 10) and dealer 14 of an open-circuited or short-circuited ISC valve and the necessity for running a wiring check or replacing the ISC valve.

The above example assumes that the terminal voltage is measured to check the ISC valve for an open circuit/short circuit. However, the present invention is not limited to such an open circuit/short circuit diagnosis method. Alternatively, an open-circuit check may be conducted by forcibly operating the ISC valve to check whether the relationship between the resulting ISC control amount and AFM measured air amount Ga is proper. Another alternative judgment method is to check whether an ISC valve terminal current is normal.

If the ISC valve is not found to be open-circuited or short-circuited when an identification process is performed in step 168, the information center 12 starts an identification process to check whether the ISC valve is stuck (step 172). More specifically, the information center 12 requests the vehicle 10 to return the ISC valve operation amount (opening degree instruction) and actual opening degree (opening sensor output) to the information center 12 as the required diagnostic data.

If the ISC valve is stuck, it does not open to in accordance with the operation amount. If a proper relationship does not exist between the opening degree and the operation amount, which is returned as the required diagnostic data, the information center 12 concludes that the ISC valve is stuck (step 174). When the fault is identified in this manner, the information center 12 issues an identification completion instruction to the vehicle 10 so that the fault identification process ends. In addition, the information center 12 notifies the user (vehicle 10) and dealer 14 of a stuck ISC valve and the necessity for cleaning or replacing the ISC valve.

The above example assumes that the ISC valve is provided with an opening degree sensor. However, if the ISC valve is not provided with an opening degree sensor, the AFM measured air amount Ga may be used as a substitute for the opening degree and as the basis for judging whether the ISC valve is stuck. The above example also assumes that a stuck ISC valve is checked for by determining whether there is a proper static relationship between the ISC valve control amount and the opening degree (or AFM measured air amount Ga). However, the present invention is not limited to the use of such a judgment method. Alternatively, a stuck ISC valve may be checked for by forcibly operating the ISC valve to determine whether there is a proper relationship between the resulting control amount change and the change in the opening degree or AFM measurement air amount Ga.

If the ISC valve is not found to be stuck when an identification process is performed in step 172, the information center 12 concludes that the ISC valve is normal. In this instance, the information center 12 concludes that the entire intake system for the internal combustion engine is clogged (step 176). Further, the information center 12 notifies the user (vehicle 10) and dealer 14 of a clog in the entire intake system and the necessity for cleaning or replacing an air cleaner.

As described above, when a Level 2 or Level 3 failure or defect is detected, the system according to the present embodiment can identify a fault, which is the cause of the fault or defect, while allowing the information center 12 and vehicle 10 to exchange information. In this instance, a major information process for fault identification is performed in the information center 12. Therefore, the load on the ECU 16 in the vehicle 10 is sufficiently reduced. As a result, the system according to the present embodiment provides a function for identifying a serious fault without requiring the on-vehicle ECU 16 to have a high processing capacity and allowing the dealer 14 or other external institution to share the information about the fault.

(Typical Recovery Process)

Figure 7:
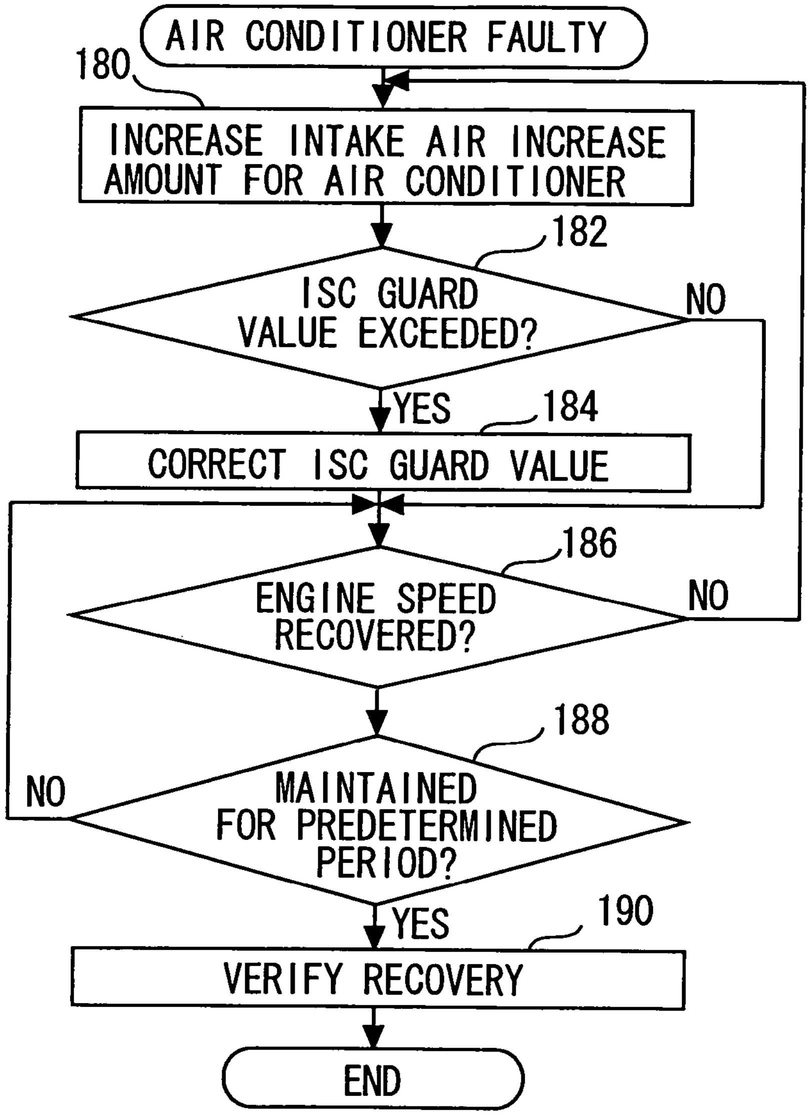
FIG. 7 is a typical flowchart illustrating a recovery process that is performed at the information center.

When an identified fault is a Level 3 fault, the information center 12 performs a recovery process to eliminate the influence of the fault as described earlier. FIG. 7 is a typical flowchart illustrating the recovery process to be performed at the information center 12. The recovery process shown in FIG. 7 is performed when the engine speed Ne is found to be abnormally low. More specifically, FIG. 7 shows a recovery process that is performed when it is found that the engine speed Ne is unduly lowered by an abnormal increase in the air-conditioner load.

In the recovery process shown in FIG. 7, an instruction for increasing the correction-increasing amount in the intake air amount Ga for air-conditioner operation by a predetermined amount is first issued to the vehicle (step 180). To prevent the engine speed Ne from being decreased by an air-conditioner operation, the vehicle 10 adds an air-conditioner correction amount to a basic intake air amount Ga during an air-conditioner operation. Upon receipt of the instruction issued in step 180, the vehicle 10 performs a process for increasing the air-conditioner correction amount. As a result, the present embodiment inhibits the engine speed Ne from decreasing during an air-conditioner operation no matter whether the air-conditioner load increases.

Next, the information center 12 judges whether an idling intake air amount exceeds an ISC guard value due to the above-mentioned increase in the air-conditioner correction amount (step 182). In the vehicle 10, an ISC guard is set for the idling intake air amount in order to prevent an unnecessary high output from being generated during idling. Therefore, when an instructed intake air amount Ga exceeds the ISC guard because of the increase in the air-conditioner correction amount, the request for an increase in the air-conditioner correction amount may not always be thoroughly fulfilled, since the actual intake air amount Ga is restricted by the guard.

Accordingly, the information center 12 instructs the vehicle 10 to increase the ISC guard value as needed to prevent it from being exceeded by the idling intake air amount Ga, when it is judged that the idling intake air amount Ga is about to exceed the ISC guard value (step 184). In the vehicle 10, therefore, the requested increase amount for the air-conditioner correction amount can be actually reflected in the idling intake air amount Ga without regard to the existence of the ISC guard.

When instructing the vehicle 10 to increase the air-conditioner correction amount, the information center 12 also requests the vehicle 10 to return as appropriate the idling speed Ne measured after the air-conditioner correction amount increase. Upon receipt of the idling speed Ne, the information center 12 notes the received idling speed Ne and judges whether the engine speed Ne is restored to a normal value, that is, 400 rpm or higher (step 186).

If the obtained judgment result indicates that the engine speed Ne is not restored to the normal value, processing step 180 and following steps are repeated to increase the air-conditioner correction amount again. If, on the other hand, the judgment result indicates that the engine speed Ne is restored to the normal value, step 188 is performed to judge whether the normal engine speed value has been maintained for a predetermined period of time.

If the obtained judgment result indicates that the normal engine speed value has not been maintained for the predetermined period of time, processing step 186 is repeated. If the judgment result obtained after such processing step repetition indicates that the normal engine speed value has been maintained for the predetermined period of time, the information center 12 verifies that the engine speed Ne is restored to normal, and informs the vehicle 10 of such engine speed normalization (step 190). As a result, the vehicle 10 recognizes that the restoration process is terminated (refer to step 156).

The engine speed Ne unduly lowers not only when the air-conditioner load is unduly increased, but also when the load on another auxiliary device is increased, when the internal combustion engine main body friction is increased, and when the ISC valve is clogged, open-circuited, short-circuited, or stuck. In a case where the load on an auxiliary device other than the air conditioner is increased, the engine speed Ne can be restored to normal by increasing the correction air amount as is the case when the load on the air conditioner is increased. In a case where the internal combustion engine main body friction is increased, the engine speed Ne can be restored to normal by increasing the basic intake air amount. Further, in a case where the ISC valve is clogged, open-circuited, short-circuited, or stuck, the influence of the fault can be eliminated by adjusting the required air amount with other air amount control device which is used with the ISC valve, such as an electronic throttle, or power steering air amount control valve. It means that the system according to the present embodiment can recover the proper engine speed Ne by performing an appropriate recovery process to take the above-mentioned countermeasures in accordance with the identified fault when an undue decrease in the engine speed Ne is detected.

Level 3 faults or defects for which the present embodiment performs a recovery process include not only an undue decrease in the engine speed Ne, which is mentioned above, but also an acceleration failure, abnormal sound, abnormal knock, and pre-ignition. As regards the acceleration failure, its influence can be eliminated by increasing the air amount to a possible extent as far as it is caused by intake air amount insufficiency. The influence of the abnormal knock can be eliminated by correcting the ignition timing. The system according to the present embodiment performs procedures for eliminating the influence of a fault as a recovery process when the influence of the fault can be eliminated by correcting the control amount within the vehicle 10 as described above. If the influence of a fault (e.g., pre-ignition) cannot be eliminated by performing a recovery process within the vehicle 10, the system according to the present embodiment performs procedures for informing the user of the necessity for immediate servicing at a servicing institution as a recovery process.

As described above, the system according to the present embodiment enables the vehicle 10 to identify a fault, which is the cause of a serious failure or defect (Level 2 or Level 3 fault or defect) encountered in the vehicle 10. Further, if the identified fault is an urgent fault (Level 3 fault), the system according to the present embodiment immediately performs a recovery process on the vehicle 10 to eliminate the influence of the fault. Consequently, the system according to the present embodiment effectively prevents the vehicle 10 from becoming unable to run on a road.

The system according to the present embodiment permits the information center 12 to perform a major process for identifying a fault (identification process) and a major process for eliminating the influence of an identified fault (recovery process). As a result, the system according to the present embodiment provides excellent advantages described above without imposing a heavy load on the on-vehicle ECU 16.

In the first embodiment, which has been described above, the information center 12 performs a fault diagnostic process (step 114) for detecting a Level 2 or Level 3 fault or defect in accordance with vehicle data. However, the present invention is not limited to such a fault diagnostic process execution. Alternatively, the vehicle 10 may perform a fault diagnostic process and transmit only the information about a detected fault or defect to the information center 12.

The first embodiment, which has been described above, causes the information center 12 to inform the vehicle 10 of the identification processing steps to be sequentially performed for the purpose of identifying the cause of a detected fault or defect, and causes the vehicle 10 to transmit sequentially obtained required diagnostic data to the information center 12. However, the present invention is not limited to the use of such a method. An alternative is to let the information center 12 inform the vehicle 10 of only a starting point of a series of processing steps that are to be performed for identifying the cause of a detected fault or defect, allow the vehicle 10 to perform the subsequent processing steps until fault identification is completed, and cause the vehicle 10 to transmit only the information about an identified fault to the information center 12.

When performing a recovery process to eliminate the influence of an identified fault, the first embodiment, which has been described above, causes the information center 12 to inform the vehicle 10 of the processing steps to be sequentially performed, and causes the vehicle 10 to sequentially transmit the resulting post-processing data to the information center 12. However, the present invention is not limited to the use of such a method. An alternative is to let the information center 12 inform the vehicle 10 of only the first recovery process step to be performed on an identified fault, and allow the vehicle 10 to perform the subsequent processing steps until recovery is completed.

Second Embodiment

A second embodiment of the present invention will now be described with reference to FIG. 3 again. The second embodiment of the present invention can be implemented by using the same hardware configuration as for the first embodiment. The system according to the first embodiment, which has been described earlier, unconditionally handles an abnormal engine speed decrease, acceleration failure, abnormal sound, abnormal knock, and pre-ignition, which are the signs of an engine stall, as a Level 3 fault or defect.

However, when the engine speed Ne is abnormally decreased, for instance, to a level slightly below 400 rpm, it is not highly likely that the engine would stall immediately. In other words, when the engine speed Ne is abnormally decreased to approximately 400 rpm, it is not always necessary to take immediate countermeasures. If a fault identification or recovery process is performed immediately in such a situation, the load on the ECU 16 or computer system 22 may unnecessarily increase.

The same also holds true for an acceleration failure, abnormal sound, and abnormal knock. These faults or defects do not always have to be recognized as a Level 3 fault or defect. On the contrary, these faults or defects should be judged to classify the severity, thus, only severe faults or defects should be classified to Level 2 or Level 3 faults or defects in order to prevent the load on the ECU 16 and computer system 22 from being unduly increased. Further, only the severest faults or defects should be classified as Level 3 faults or defects to limit the target for fault identification control and the target for recovery control.

As such being the case, the system according to the present embodiment classifies an undue decrease in the engine speed Ne into three different levels, handling it as Level 3 only when Ne<200 rpm, as Level 1 when 200 rpm ≦Ne<300 rpm, and as Level 1 when 300 rpm≦Ne<400 rpm. The present embodiment also classifies an acceleration failure, abnormal sound, and abnormal knock into three different levels. More specifically, the present embodiment handles the severest faults as Level 3 faults, moderate faults as Level 2 faults, and the least severe faults as Level 1 faults.

Under the above circumstances, acceleration failures are classified into three different levels depending on the detected acceleration or the magnitude of a vehicle speed change. Abnormal sounds are classified into three different levels depending on the part identified as an abnormal sound source and on the sound pressure level. An abnormal knock is classified into three different levels depending on the knock intensity detected by a knock sensor or the like. However, pre-ignition should always be recognized as an urgent fault without regard to its intensity. Therefore, the present embodiment always recognizes pre-ignition as a Level 3 failure or defect.

To implement the functionality described above, the system according to the present embodiment causes the ECU 16 in the vehicle 10 to transmit only vehicle data classified in accordance with the above-mentioned definition as Level 2 or Level 3 to the information center 14 in step 102, which is shown in FIG. 3. Meanwhile, the computer system 22 at the information center 12 performs step 116, which is shown in FIG. 3, to recognize only faults or defects belonging to Level 2 or Level 3 in accordance with the above-mentioned definition as serious faults. In step 134, the computer system 22 at the information center 12 complies with the above definition and recognizes only Level 3 faults as faults for which a recovery procedure needs to be performed.

Therefore, even when an undue decrease in the engine speed Ne or an abnormal knock is recognized, the system according to the present embodiment will omit the information exchange between the vehicle 10 and the information center 12 if it is classified to a Level 1 fault. If such a fault is recognized as a Level 2 fault, the system according to the present embodiment performs a fault identification process but refrains from performing a recovery process. As a result, the computation load imposed on the ECU 16 and computer system 22 by the system according to the present embodiment is lighter than that is imposed by the system according to the first embodiment.

Third Embodiment

A third embodiment of the present invention will now be described with reference to FIGS. 8 to 11. The system according to the third embodiment is implemented when the ECU 16 and computer units 22, 26, which are included in the hardware configuration according to the first embodiment, perform processing steps that are described later with reference to FIG. 9 instead of the processing steps indicated in FIG. 3.

Figure 8:
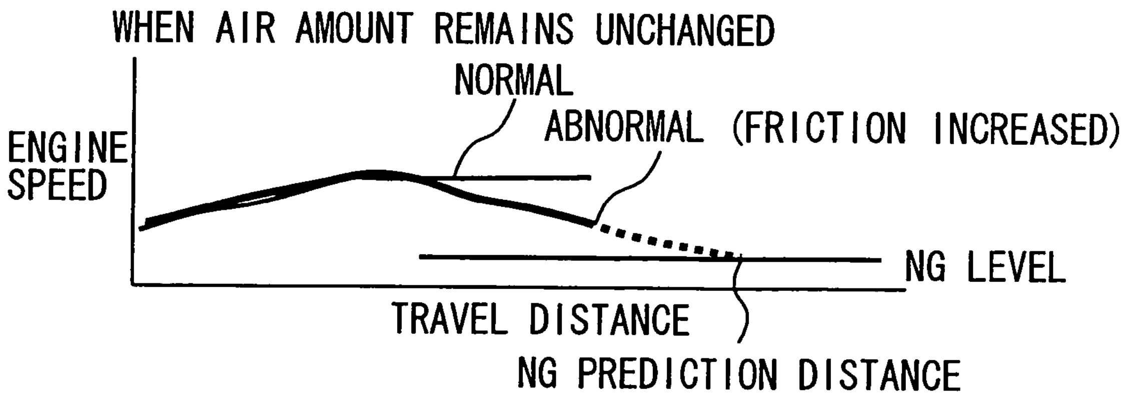
FIG. 8 illustrates the relationship between the engine speed Ne and vehicle travel distance that are measured under the same load conditions during idling.

Some of vehicle data 10 that is detected in the vehicle 10 are affected by changes due to time passage arising in the internal combustion engine and other. For example, the engine speed Ne prevailing under fixed load conditions correlates with an increase/decrease in the internal combustion engine friction. FIG. 8 illustrates the relationship between the engine speed Ne and vehicle travel distance that are measured under the same load conditions during idling.

In general, the internal combustion engine friction decreases with an increase in the degree of engine running-in. In a small travel distance region, therefore, the engine speed Ne shown in FIG. 8 tends to increase in proportion to the travel distance. When various parts considerably wear due to an increased travel distance, the engine speed Ne begins to decrease with an increase in running resistance.

As for the idling engine speed Ne, there is a lower-limit value which is necessary for assuring that the internal combustion engine keeps on running steadily. The NG level shown in FIG. 8 represents the lower-limit value. When the lower-limit value for the engine speed Ne is predetermined and the tendency of an engine speed decrease in relation to the travel distance is grasped, it is possible to estimate the travel distance remaining before the actual Ne value reaches the NG level. The present embodiment causes the information center 12 to estimate the remaining travel distance, and uses the result of estimation as the maintenance information for the vehicle 10.

Figure 9:
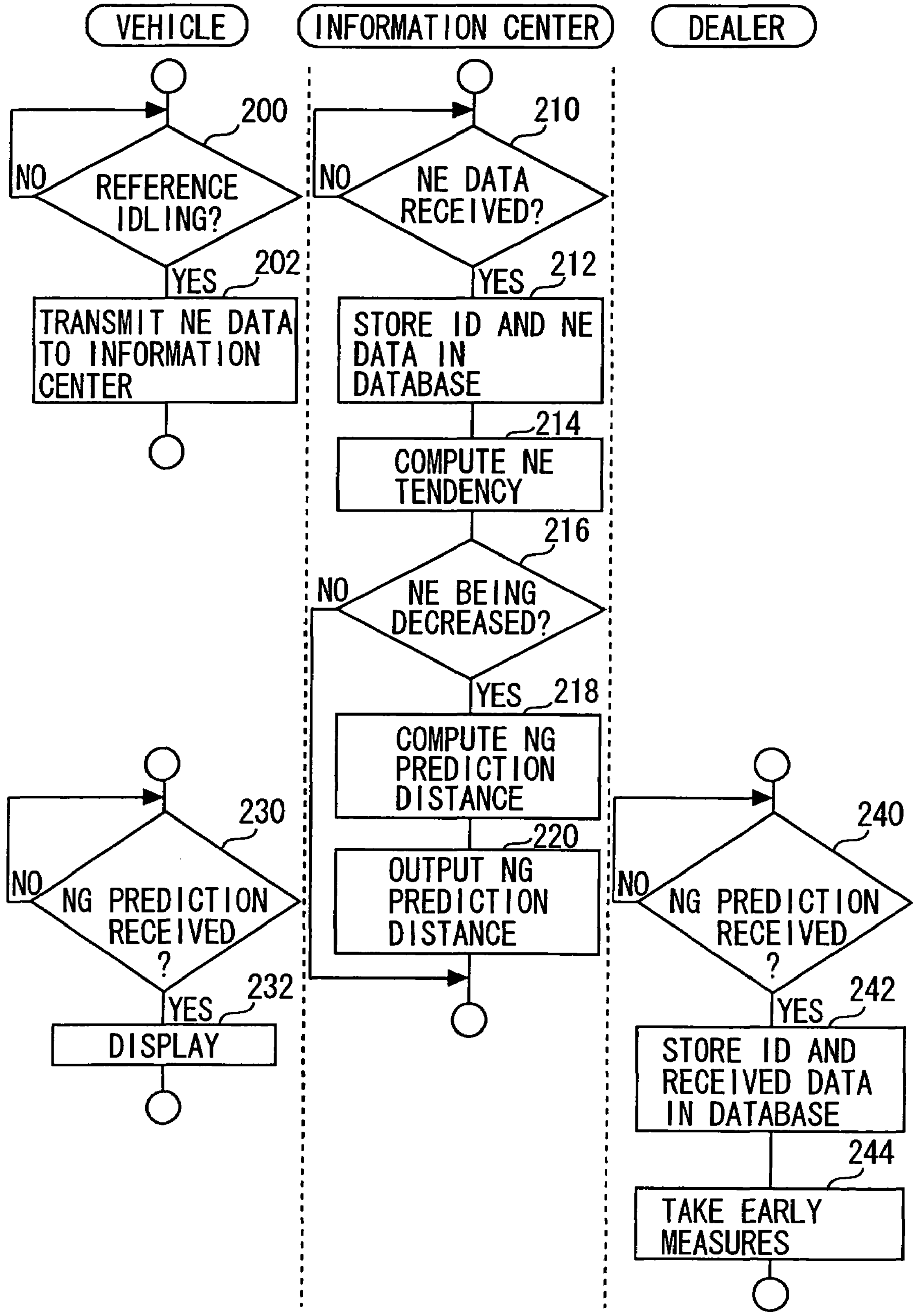
FIG. 9 is a flowchart illustrating processing steps that the vehicle, information center, and dealer respectively perform in order to implement the functionality of a third embodiment of the present invention.

FIG. 9 is a flowchart illustrating processing steps that the vehicle 10, information center 12, and dealer 14 respectively perform in order to implement the above functionality. As indicated in the figure, the ECU 16 in the vehicle 10 judges whether a reference idle state is established (step 200). The reference idle state is defined as a state in which the internal combustion engine idles under a virtually fixed load. More specifically, it is preferred that the alternator generates a constant load while the other auxiliary devices are stopped. When it is judged that the reference idle state is established, the vehicle 10 transmits the currently detected engine speed Ne to the information center 12 (step 202).

The information center 12 receives the engine speed data from the vehicle 10 (step 210), and then stores the data in a database within the computer system 22 (step 212). More specifically, the database stores the transmitted engine speed Ne and the ID of the vehicle 10 that has transmitted the data. Next, the current tendency toward an engine speed change is computed in accordance with the latest engine speed Ne and previous engine speed Ne stored in the database (step 214).

Then, judgment is made to determine whether the computation result indicates decrease tendency of the engine speed Ne (step 216). If the obtained judgment result does not indicate the decrease tendency of the engine speed Ne, it is concluded that the engine speed Ne will not possibly decrease to the NG level. Therefore, the current process terminates. If, on the other hand, the obtained judgment result indicates that the engine speed Ne tends to decrease, the travel distance remaining before the engine speed Ne reaches the NG level is calculated in accordance with the gradient of the engine speed Ne relative to the travel distance and a predefined NG value (e.g., 400 rpm) for the engine speed (step 218). The calculated travel distance is then transmitted to the vehicle 10 and dealer 14 (step 220).

The vehicle 10 receives the above NG information (travel distance) (step 230), which is transmitted from the information center 12, and then performs a process for presenting the information to the driver/passenger in the vehicle 10, that is, the user (step 232).

Meanwhile, the dealer 14 receives the NG information (step 240), and then stores the ID of the vehicle 10 and the received data, that is, the travel distance remaining before the NG state is established, in the database within the computer system 26 (step 242). Next, the dealer 14 performs a process to take early countermeasures automatically for the purpose, for instance, of sending a message to the user (via e-mail or the like) and placing an advance order for replacement parts (step 244).

As described above, the system according to the present embodiment can estimate in advance the travel distance remaining before the vehicle 10 becomes unable to run by monitoring for engine speed changes during the reference idle state. Further, the system according to the present embodiment can let the information center 12 perform a major process that is necessary for such estimation. As a result, the system according to the present embodiment implements a function for predicting a serious fault of the vehicle 10 and taking early measures against the fault without imposing a great load on the ECU 16.

The third embodiment, which has been described above, predicts the travel distance remaining before the NG state is invoked by an increase in the internal combustion engine friction. However, the target for prediction is not limited to such a travel distance. An alternative target for prediction may be a travel distance that is remaining before the NG state is established due to a fault in the ISC valve or an increase in an auxiliary device friction. Hereinafter, a method for predicting the travel distance remaining before the NG state is established due to a fault in the ISC valve will now be described as the explanation of a typical modified version of the third embodiment.

Figure 10:
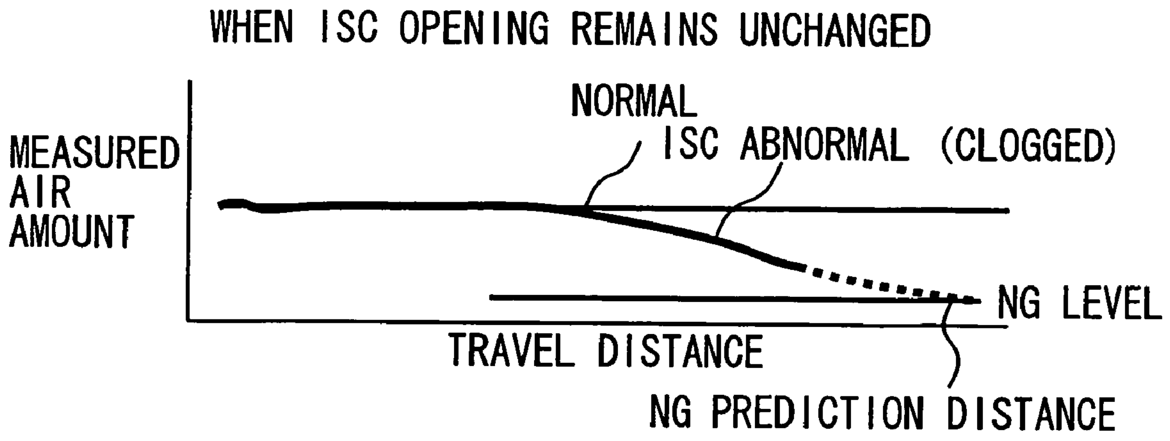
FIG. 10 illustrates the relationship between the AFM measured air amount Ga and vehicle travel distance prevailing when an ISC opening remains unchanged.

FIG. 10 illustrates the relationship between the AFM measured air amount Ga and vehicle travel distance prevailing when an ISC opening degree remains unchanged. As indicated in FIG. 10, the AFM measured air amount tends to decrease at the same ISC opening degree after the ISC valve begins to become clogged. Therefore, when the tendency to decrease is monitored, it is possible to predict the travel distance remaining before the engine stalls due to a clogged ISC valve.

Figure 11:
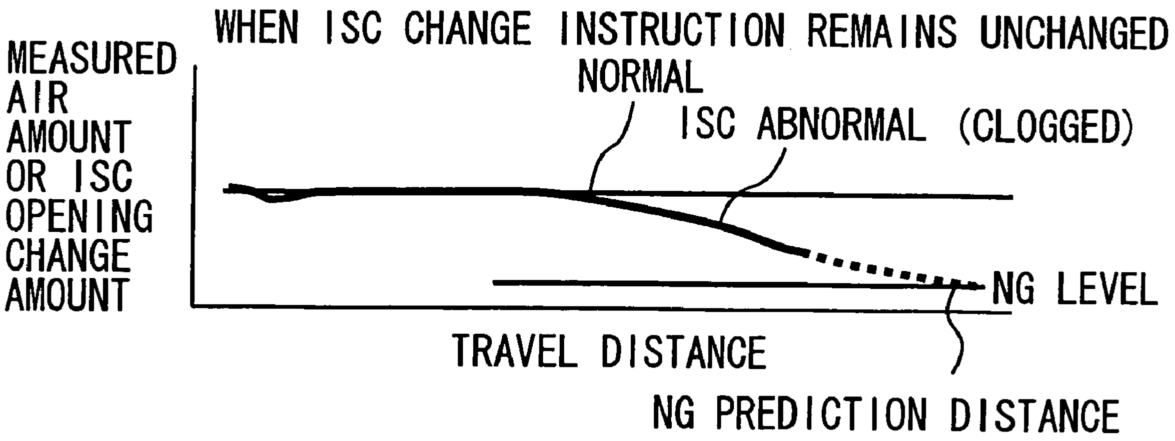
FIG. 11 illustrates the relationship between the vehicle travel distance and the amount of an ISC opening (or AFM measured air amount Ga) change that occurs within reference time when the same change instruction value is given to an ISC valve.

FIG. 11 illustrates the relationship between the vehicle travel distance and the amount of an ISC opening degree (or AFM measured air amount Ga) change that occurs within reference time when the same change instruction value is given to the ISC valve. While the ISC valve's response is normal, there arises normal amount of change in the ISC opening degree and AFM measured air amount Ga within the above reference time. However, if the ISC valve begins to become clogged, the ISC valve's response becomes worse so that the amounts of changes in the ISC opening degree and AFM measured air amount Ga are too small during the reference time. Thus, it is possible to predict the travel distance remaining before the engine stalls due to a clogged ISC valve by monitoring the amounts of changes in the ISC opening degree or AFM measured air amount Ga arising during the reference time.

In the third embodiment, which has been described above, the travel distance remaining before the NG state is established is predicted at the information center 12. However, the present invention is not limited to the use of such a method. Alternatively, the vehicle 10 may predict the travel distance and transmit only the predicted travel distance to the information center 12.

Fourth Embodiment

A fourth embodiment of the present invention will now be described. When a Level 3 fault is encountered, the first and second embodiments, which have been described earlier, perform a recovery procedure to minimize the influence of the fault. If, for instance, the air conditioner is unduly loaded (see FIG. 7), the first and second embodiments perform a recovery procedure for increasing the correction increase amount for the intake air amount Ga at the time of air-conditioner operation or increasing the ISC guard value. The above correction increase amount, ISC guard value, and other parameters that are to be changed for the execution of a recovery procedure are hereinafter referred to as the "recovery parameters."

When an encountered Level 3 fault is repaired, there is no need to perform a recovery procedure. In other words, the values of the recovery parameters, which are changed for the execution of a recovery procedure, are improper after the vehicle is repaired. When the dealer 14 repairs a fault for which a recovery procedure is performed, the fourth embodiment causes the dealer 14 to reset the recovery parameters to their initial values.

More specifically, in the present embodiment, it is assumed that the recovery parameters are not reset to their initial values when a "battery clear" procedure is performed, and the recovery parameters are reset to their initial values when the dealer 14 gives a special external input to the ECU 16. Further, in this embodiment, the ECU 16 records a history of parts changes and other events related to fault repairs.

When a fault is repaired after the execution of a recovery procedure, the system according to the present embodiment allows the dealer 14 to properly reset the recovery parameters to their initial values as described above. Consequently, the system according to the present embodiment properly avoids a situation where proper control cannot be exercised after fault repairs due to improperly maintained recovery parameter values.

Fifth Embodiment

A fifth embodiment of the present invention will now be described with reference to FIG. 12. The system according to the fifth embodiment is implemented when the ECU 16 and computer units 22, 26, which are included in the configuration shown in FIG. 1, perform processing steps that are described later with reference to FIG. 12.

The characteristics of the parts used for the vehicle usually vary within a tolerance range. As regards parts that need to be controlled with high accuracy, the control operations for the parts should be corrected upon parts replacement in order to comply with the characteristics of newly installed parts. In the system according to the present embodiment, therefore, the vehicle 10, information center 12, and dealer 14 exchange necessary data so as to implement the required functionality.

Figure 12:
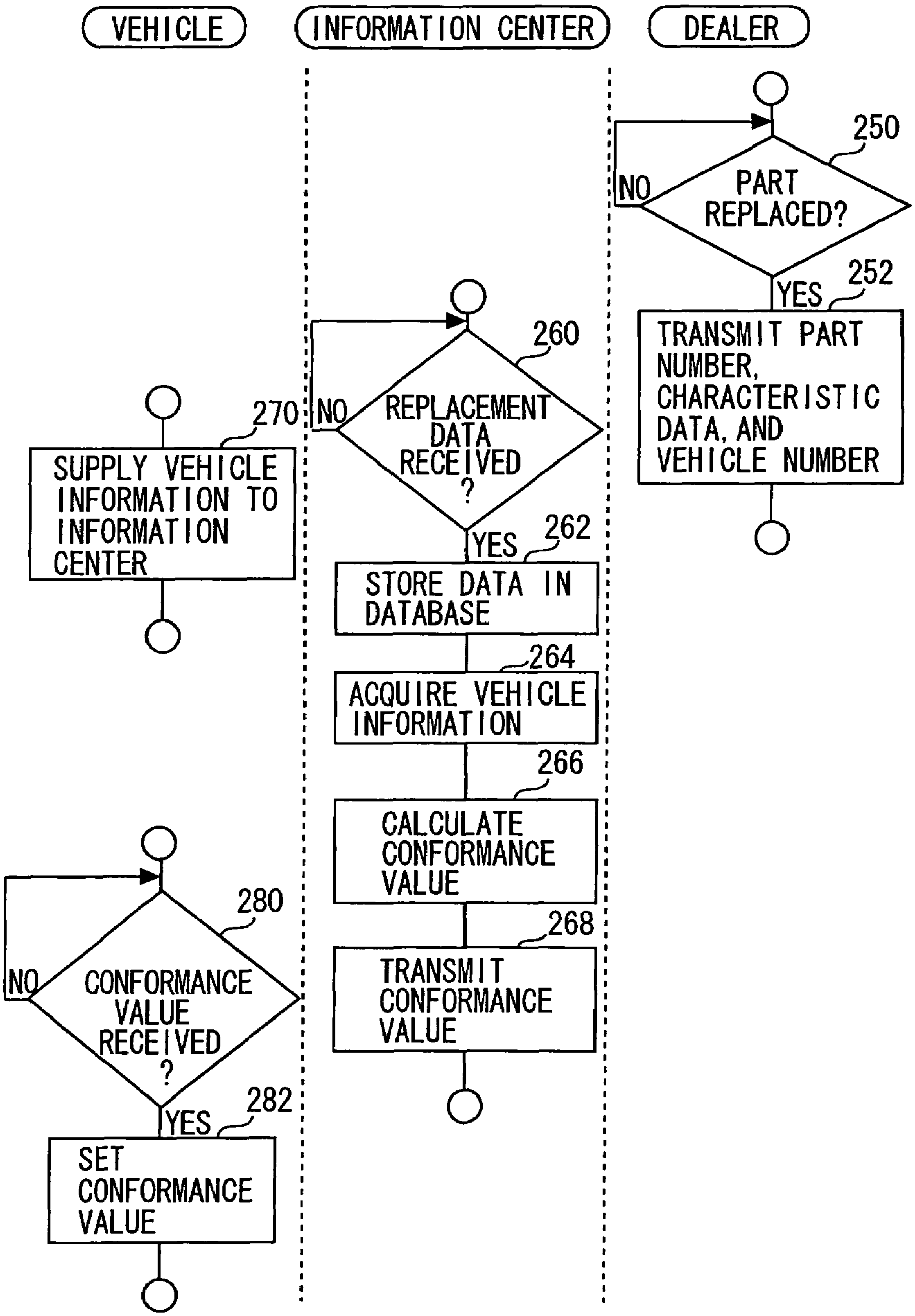
FIG. 12 is a flowchart illustrating processing steps that are performed in a fourth embodiment of the present invention.

FIG. 12 is a flowchart illustrating processing steps that the present embodiment performs in order to implement the above functionality. According to the routine shown in FIG. 12, after replacing a vehicle part (step 250), the dealer 14 transmits the specified number of a replacement part, the characteristic data of the part, and the specified number of the affected vehicle to the information center 12. These transmitted data are hereinafter referred to as the "replacement data."

The term "characteristic data" refers to data that accurately represents the input/output characteristics of a replacement part. If, for instance, the ISC valve is replaced, the opening degree vs. flow rate characteristic measured of the ISC valve that is used as the replacement part is transmitted to the information center 12 as the characteristic data.

When receiving the replacement data from the dealer 14 (step 260), the information center 12 registers the data in the database (step 262). Next, the information center 12 reads the vehicle information relating to the control of the replacement part from the database (step 264). It is be noted that the vehicle information read out here is supplied from the vehicle 10 to the information center 12 via a communications link in advance or is supplied as needed in compliance with a request from the information center 12 (step 270).

In accordance with the replacement data supplied from the dealer 14 and the vehicle information supplied from the vehicle 10, the information center 12 calculates a matching value for exercising accurate control over the replacement part (step 266). When the matching value is calculated, the information center 12 transmits the calculated matching value to the vehicle 10 (step 268).

Upon receipt of the matching value from the information center 12, the vehicle 10 performs a setup process for ensuring that the matching value is reflected in the control (steps 280 and 282). As described above, the system according to the present embodiment can set a matching value, which matches the characteristics of a replacement part, within the vehicle 10 when a part of the vehicle 10 is replaced. The system according to the present embodiment, therefore, permits the vehicle 10 to exercise replacement parts control with high accuracy immediately after parts replacement.

In the fifth embodiment, which has been described above, the information center 12 also uses the vehicle information when calculating the matching value. However, the present invention is not limited to the use of such a method. The matching value for a replacement part may alternatively be calculated only on the basis of replacement data transmitted from the dealer 14.

Sixth Embodiment

A sixth embodiment of the present invention will now be described with reference to FIG. 13. In the third embodiment, which has been described earlier, the information center 12 detects a sign of a fault in the vehicle 10 in accordance with various information supplied from the vehicle 10, and predicts the possible travel distance remaining before the vehicle 10 becomes unable to run. If, for instance, a sign of a clogged ISC valve is detected, the information center 12 notes the sign and predicts the possible travel distance remaining before the ISC valve fails to properly operate. When the possible travel distance is calculated, the information center 12 supplies the calculated value to the vehicle 10 and dealer 14 to provide against a vehicle fault.

Figure 13:
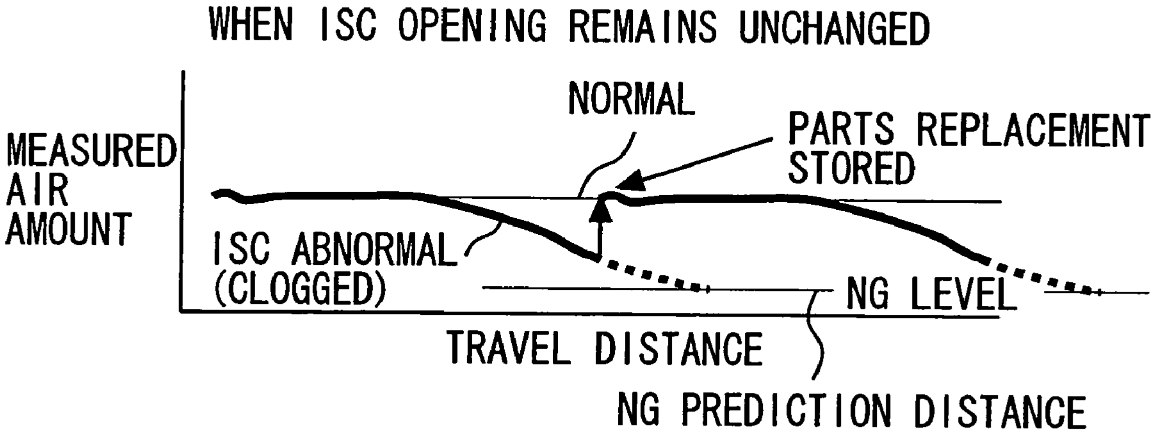
FIG. 13 illustrates the relationship between the vehicle travel distance and a sign of ISC valve clogging (AFM measured air amount Ga prevailing when the ISC opening remains unchanged).

FIG. 13 illustrates the relationship between the vehicle travel distance and a sign of ISC valve clogging (AFM measured air amount Ga prevailing when the ISC opening remains unchanged). As indicated in FIG. 13, when the ISC valve is clogged, the AFM measured air amount Ga tends to decrease while the ISC opening degree remains unchanged. The system according to the third embodiment monitors such a tendency to decrease and predicts the travel distance remaining before the engine stalls due to a clogged ISC valve.

FIG. 13 illustrates a case where the ISC valve is replaced with a new one before the former is completely clogged. As indicated in FIG. 13, the possible travel distance remaining before the vehicle 10 becomes unable to run should inevitably be reset (set to the maximum value) when a part that is the cause of the fault (ISC valve in this case) is replaced. The system according to the present embodiment, therefore, resets all data concerning the possible travel distance when the part that has been the cause of the calculation of the possible travel distance is replaced in the dealer 14.

More specifically, the information about the possible travel distance, which is possessed by the vehicle 10, information center 12, and dealer 14, is reset upon parts replacement. More concretely, the possible travel distance information possessed by the vehicle 10 is not reset by a "battery clear" whereas being resets when a special external input is given to the ECU 16 at the dealer 14. The information possessed by the information center 12 is reset upon receipt of a communication from the dealer.

According to the above procedure, it is possible to properly reset the information about the possible travel distance that is set stemming from a deteriorated part when the part that has been the cause of the calculation of a possible travel distance is repaired, in the present embodiment. As a result, the system according to the present embodiment properly prevents the possible travel distance information that is set before parts replacement from being unreasonably retained after parts replacement.

The features and effect of the present invention can be summarized as follows.

The first aspect of the present invention accords with a vehicle fault diagnostic system, which includes a vehicle and an information center that are capable of communicating with each other, the vehicle fault diagnostic system comprising: vehicle data detection means that is installed in the vehicle to detect vehicle data; fault detection means that is installed in the vehicle or in the information center to detect a vehicle fault in accordance with said vehicle data; identification process instruction means that is installed in the information center to find arising of the vehicle fault and to instruct the vehicle to perform a fault identification process for identifying the cause of the vehicle fault; identification process execution means that is installed in the vehicle to perform the fault identification process that is instructed; identification process result return means that is installed in the vehicle to return the result of said fault identification process to the information center; fault location identification means that is installed in the information center to identify the fault location in accordance with the result of said fault identification process, which is returned from the vehicle; and identified fault countermeasure means that is installed in the information center to take countermeasures against the identified fault.

The second aspect of the present invention accords with the vehicle fault diagnostic system according to the first aspect of the present invention, wherein said identified fault countermeasure means includes recovery process instruction means for instructing the vehicle to perform a recovery process for eliminating the influence of the identified fault, the vehicle fault diagnostic system further comprising: recovery process execution means that is installed in the vehicle to perform the recovery process that is instructed; and process determination means that is installed in the vehicle or in the information center to determine in accordance with the result of said recovery process whether another recovery process should be continued or not.

The third aspect of the present invention accords with the vehicle fault diagnostic system according to the second aspect of the present invention, wherein said recovery process instruction means includes most serious fault storage means for storing most serious faults and recovery target limiting means for issuing instructions for performing said recovery process only when a detected fault is one of the most serious faults.

The fourth aspect of the present invention accords with the vehicle fault diagnostic system according to any one of the first to third aspects of the present invention, wherein said identification process instruction means includes serious fault storage means for storing serious faults and identification target limiting means for issuing instructions for performing said fault identification process only when a detected fault is serious.

The fifth aspect of the present invention accords with a vehicle fault diagnostic system, which includes a vehicle and an information center that are capable of communicating with each other, the vehicle fault diagnostic system comprising: vehicle data detection means that is installed in the vehicle to detect vehicle data; fault detection means that is installed in the vehicle or in the information center to detect a vehicle fault in accordance with said vehicle data; recovery process instruction means that is installed in the information center to find arising of the vehicle fault and to instruct the vehicle to perform a recovery process for eliminating the influence of the vehicle fault; recovery process execution means that is installed in the vehicle to perform the recovery process that is instructed; and process determination means that is installed in the vehicle or in the information center to determine in accordance with the result of said recovery process whether another recovery process should be continued or not.

The sixth aspect of the present invention accords with the vehicle fault, diagnostic system according to the fifth aspect of the present invention, wherein said recovery process instruction means includes most serious fault storage means for storing most serious faults and recovery target limiting means for issuing instructions for performing said recovery process only when a detected fault is one of the most serious faults.

The seventh aspect of the present invention accords with a vehicle fault diagnostic system, which includes a vehicle and an information center that are capable of communicating with each other, the vehicle fault diagnostic system comprising: fault characteristic value detection means that is installed in the vehicle to detect a fault characteristic value stemming from arising of a particular fault; fault seriousness determining means for determining the serious degree of detected said fault in accordance with the magnitude of said fault characteristic value; and supply information limiting means for supplying the detected information about said fault to the information center only when said serious degree exceeds a judgment value.

The eighth aspect of the present invention accords with the vehicle fault diagnostic system according to the seventh aspect of the present invention, the system further comprising: recovery process instruction means that is installed in the information center to instruct the vehicle to perform a recovery process for eliminating the influence of said fault whose information is supplied from the vehicle; recovery process execution means that is installed in the vehicle to perform the recovery process that is instructed; and process determination means that is installed in the vehicle or in the information center to determine in accordance with the result of said recovery process whether another recovery process should be continued or not.

The ninth aspect of the present invention accords with the vehicle fault diagnostic system according to the eighth aspect of the present invention, wherein said supply information limiting means supplies information including said fault characteristic value to the information center as the information about said fault, and wherein said recovery process instruction means includes urgency judgment means, which, when the information about said fault is supplied from the vehicle, judges in accordance with said fault characteristic value whether the fault should be recognized as an urgent fault; and recovery target limiting means for issuing instructions for performing said recovery process only when said fault whose information is supplied from the vehicle is urgent.

The tenth aspect of the present invention accords with the vehicle fault diagnostic system according to any one of the seventh to ninth aspects of the present invention, the system further comprising: identification process instruction means that is installed in the information center to instruct the vehicle to perform a fault identification process for identifying the cause of said fault whose information is supplied from the vehicle; identification process execution means that is installed in the vehicle to perform the fault identification process that is instructed; identification process result return means that is installed in the vehicle to return the result of said fault identification process to the information center; and fault location identification means that is installed in the information center to identify a fault location in accordance with the result of said fault identification process, which is returned from the vehicle.

The eleventh aspect of the present invention accords with the vehicle fault diagnostic system according to any one of the first to tenth aspects of the present invention, wherein said fault identification process includes a plurality of inspection modes, and wherein said fault location identification means includes identification process completion means, which determines that the fault identification process is completed when a fault location can be identified in accordance with a fault identification process result that is returned from the vehicle; and identification process continuation means, which causes said identification process instruction means to instruct the start of an inspection mode corresponding to the result when the fault location cannot be identified in accordance with said result.

The twelfth aspect of the present invention accords with the vehicle fault diagnostic system according to any one of the first to eleventh aspects of the present invention, the system further comprising: fault distance estimation means that is installed in the vehicle or in the information center to estimate the travel distance remaining before a fault occurs in the vehicle in accordance with said vehicle data; and either fault distance display means for displaying said travel distance remaining before a fault occurrence within the display or fault distance transmission means for transmitting said travel distance to a vehicle maintenance factory.

According to the first aspect of the present invention, the vehicle can receive the instructions for a fault identification process from the information center when identifying the cause of the fault that is detected in the vehicle. According to the present invention, therefore, the vehicle does not have to store the fault identification processing steps to be performed for individual faults. As a result, the information processing load on the vehicle can be reduced.

According to the second aspect of the present invention, after identifying the fault that is cause of a defect, the vehicle can perform a recovery process on board for eliminating the influence of the fault. In this instance, the vehicle can receive the instructions for the recovery process to be performed from the information center. According to the present invention, therefore, the vehicle does not have to store the recovery processing steps to be performed for individual faults. As a result, the information processing load on the vehicle can be reduced.

According to the third aspect of the present invention, a recovery process is performed only when one of the most serious faults is detected. Therefore, the present invention can minimize the possibility of processing load generation for recovery process execution.

According to the fourth aspect of the present invention, a fault identification process is performed only when a serious fault is detected. Therefore, the present invention can minimize the possibility of processing load generation for fault identification process execution.

According to the fifth aspect of the present invention, when detecting a fault the vehicle can perform a recovery process on board for eliminating the influence of the fault. In this instance, the vehicle can receive the instructions for the recovery process to be performed from the information center. According to the present invention, therefore, the vehicle does not have to store the recovery processing steps to be performed for individual faults. As a result, the information processing load on the vehicle can be reduced.

According to the sixth aspect of the present invention a recovery process is performed only when one of the most serious faults is detected. Therefore, the present invention can minimize the possibility of processing load generation for recovery process execution.

According to the seventh aspect of the present invention, it is possible to judge whether a fault that is detected on the vehicle is urgent or not on the basis of a fault characteristic value. When the urgency of the fault is low, it is possible to skip a process for supplying the information about the fault to the information center, even if the fault is one that requires immediate countermeasure when having a high urgency. As a result, the present invention can avoid unnecessary communication to effectively reduce the processing load on the vehicle.

According to the eighth aspect of the present invention, when a particular fault having a great fault characteristic value occurs in the vehicle, the vehicle is permitted to perform a recovery process for eliminating the influence of the fault. In this instance, the vehicle can receive the instructions for the recovery process to be performed from the information center. According to the present invention, therefore, the vehicle does not have to store the recovery processing steps to be performed for individual faults. As a result, the information processing load on the vehicle can be reduced.

According to the ninth aspect of the present invention, in a case where a fault information is supplied from the vehicle to the information center, a recovery process is performed only when the fault is urgent. Therefore, the present invention can minimize the possibility of processing load generation for recovery process execution.

According to the tenth aspect of the present invention, the cause of a fault is identified when the fault is detected in the vehicle having a great fault characteristic value. In this instance, the vehicle can receive the instructions for a fault identification process from the information center. According to the present invention, therefore, the vehicle does not have to store the fault identification processing steps to be performed for individual faults. As a result, the information processing load on the vehicle can be reduced.

According to the eleventh aspect of the present invention, the vehicle can perform a fault identification process that includes a plurality of inspection modes. Therefore, the present invention can properly identify a fault whose identification requires the execution of a complicated process.

According to the twelfth aspect of the present invention, it is possible to estimate the travel distance remaining before an expected fault occurrence in the vehicle, and display the estimated value within the vehicle or transmit it to a maintenance factory. Therefore, the present invention makes it possible to take appropriate early measures before the occurrence of a fault.

In the first embodiment, which has been described earlier, the "vehicle data detection means" according to the first aspect of the present invention is implemented when the vehicle 10 performs processing step 100; the "fault detection means" according to the first aspect of the present invention is implemented when the information center 12 performs processing step 114; the "identification process instruction means" and "fault location identification means" according to the first aspect of the present invention are implemented when the information center 12 performs processing step 118; the "identification process execution means" according to the first aspect of the present invention is implemented when the vehicle 10 performs processing step 122; the "identification process result return means" according to the first aspect of the present invention is implemented when the vehicle 10 performs processing step 124; and the "identified fault countermeasure means" according to the first aspect of the present invention is implemented when the information center 12 performs processing steps 130 to 136.

In the first embodiment, which has been described earlier, the "recovery process instruction means" and "process determination means" according to the second aspect of the present invention are implemented when the information center 12 performs processing steps 134 and 136; and the "recovery process execution means" according to the second aspect of the present invention is implemented when the vehicle 10 performs processing step 152.

In the first embodiment, which has been described earlier, the "most serious fault storage means" and "recovery target limiting means" according to the third aspect of the present invention are implemented when the information center 12 performs processing step 134.

In the first embodiment, which has been described earlier, the "serious fault storage means" and "identification target limiting means" according to the fourth aspect of the present invention are implemented when the information center 12 performs processing step 116.

In the first embodiment, which has been described earlier, the "vehicle data detection means" according to the fifth aspect of the present invention is implemented when the vehicle 10 performs processing step 100; the "fault detection means" according to the fifth aspect of the present invention is implemented when the information center 12 performs processing step 114; the "recovery process instruction means" and "process determination means" according to the fifth aspect of the present invention are implemented when the information center 12 performs processing steps 134 and 136; and the "recovery process execution means" according to the fifth aspect of the present invention is implemented when the vehicle 10 performs processing step 152.

In the first embodiment, which has been described earlier, the "most serious matter storage means" and "recovery target limiting means" according to the sixth aspect of the present invention are implemented when the information center 12 performs processing step 134.

In the first embodiment, which has been described earlier, the "identification process completion means" according to the eleventh aspect of the present invention is implemented when the information center 12 performs processing step 162, 166, 170, 174, or 176 as indicated in FIG. 4; and the "identification process continuation means" according to the eleventh aspect of the present invention is implemented when it is judged in steps 160, 164, 168, and 172 that the condition is not established.

In the second embodiment, which has been described earlier, the engine speed Ne prevailing in the event of an undue decrease in the engine speed, the acceleration and vehicle speed change prevailing in the event of an acceleration failure, the microphone output generated in the event of abnormal sound generation, the knock intensity prevailing in the event of an abnormal knock, and the like correspond to the "fault characteristic value"; the "fault characteristic value detection means" according to the seventh aspect of the present invention is implemented when the ECU 16 detects a fault characteristic value in step 100; and the "fault seriousness determining means" and "supply information limiting means" according to the seventh aspect of the present invention are implemented when the ECU 16 performs processing step 102.

In the second embodiment, which has been described earlier, the "recovery process instruction means" and "process determination means" according to the eighth aspect of the present invention are implemented when the information center 12 performs processing steps 134 and 136; and the "recovery process execution means" according to the eighth aspect of the present invention is implemented when the vehicle 10 performs processing step 152.

In the second embodiment, which has been described earlier, the "urgency judgment means" and "recovery target limiting means" according to the ninth aspect of the present invention are implemented when the information center 12 performs processing step 134.

In the second embodiment, which has been described earlier, the "identification process instruction means" and "fault location identification means" according to the tenth aspect of the present invention are implemented when the information center 12 performs processing step 118; the "identification process execution means" according to the tenth aspect of the present invention is implemented when the vehicle 10 performs processing step 122; and the "identification process result return means" according to the tenth aspect of the present invention is implemented when the vehicle 10 performs processing step 124.

In the third embodiment, which has been described earlier, the "fault distance estimation means" according to the twelfth aspect of the present invention is implemented when the information center 12 performs processing step 218; the "fault distance display means" according to the twelfth aspect of the present invention is implemented when the vehicle 10 performs processing step 232; and the "fault distance transmission means" according to the twelfth aspect of the present invention is implemented when the information center 12 performs processing step 220.

The invention claimed is:

1. A vehicle fault diagnostic system, which includes a vehicle and an information center that are capable of communicating with each other, the vehicle fault diagnostic system comprising:

vehicle data detection means that is installed in the vehicle to detect vehicle data;

fault detection means that is installed in the vehicle or in the information center to detect a vehicle fault in accordance with said vehicle data;

identification process instruction means that is installed in the information center to find arising of the vehicle fault and to instruct the vehicle to perform a fault identification process for identifying the cause of the vehicle fault;

identification process execution means that is installed in the vehicle to perform the fault identification process that is instructed;

identification process result return means that is installed in the vehicle to return the result of said fault identification process to the information center;.

fault location identification means that is installed in the information center to identify the fault location in accordance with the result of said fault identification process, which is returned from the vehicle; and identified fault countermeasure means that is installed in the information center to take countermeasures against the identified fault, wherein said identified fault countermeasure means includes recovery process instruction means for instructing the vehicle to perform a recovery process for eliminating the influence of the identified fault, the vehicle fault diagnostic system further comprising:

recovery process execution means that is installed in the vehicle to make the vehicle itself perform the recovery process that is instructed; and process determination means that is installed in the vehicle or in the information center to determine in accordance with the result of said recovery process whether another recovery process should be continued or not.

2. The vehicle fault diagnostic system according to claim 1, wherein said recovery process instruction means includes most serious fault storage means for storing most serious faults and recovery target limiting means for issuing instructions for performing said recovery process only when a detected fault is one of the most serious faults.

3. The vehicle fault diagnostic system according to claim 1, wherein said identification process instruction means includes serious fault storage means for storing serious faults and identification target limiting means for issuing instructions for performing said fault identification process only when a detected fault is serious.

4. The vehicle fault diagnostic system according to claim 1, wherein said fault identification process includes a plurality of inspection modes, and wherein said fault location identification means includes identification process completion means, which determines that the fault identification process is completed when a fault location can be identified in accordance with a fault identification process result that is returned from the vehicle; and identification process continuation means, which causes said identification process instruction means to instruct the start of an inspection mode corresponding to the result when the fault location cannot be identified in accordance with said result.

5. The vehicle fault diagnostic system according to claim 1, further comprising:

fault distance estimation means that is installed in the vehicle or in the information center to estimate the travel distance remaining before a fault occurs in the vehicle in accordance with said vehicle data; and either fault distance display means for displaying said travel distance remaining before a fault occurrence within the display or fault distance transmission means for transmitting said travel distance to a vehicle maintenance factory.

6. A vehicle fault diagnostic system, which includes a vehicle and an information center that are capable of communicating with each other, the vehicle fault diagnostic system comprising:

vehicle data detection means that is installed in the vehicle to detect vehicle data;

fault detection means that is installed in the vehicle or in the information center to detect a vehicle fault in accordance with said vehicle data;

recovery process instruction means that is installed in the information center to find arising of the vehicle fault and to instruct the vehicle to perform a recovery process for eliminating the influence of the vehicle fault;

recovery process execution means that is installed in the vehicle to make the vehicle itself perform the recovery process that is instructed; and process determination means that is installed in the vehicle or in the information center to determine in accordance with the result of said recovery process whether another recovery process should be continued or not.

7. The vehicle fault diagnostic system according to claim 6, wherein said recovery process instruction means includes most serious fault storage means for storing most serious faults and recovery target limiting means for issuing instructions for performing said recovery process only when a detected fault is one of the most serious faults.

8. A vehicle fault diagnostic system, which includes a vehicle and an information center that are capable of communicating with each other, the vehicle fault diagnostic system comprising:

fault characteristic value detection means that is installed in the vehicle to detect a fault characteristic value stemming from arising of a particular fault;

fault seriousness determining means for determining the serious degree of detected said fault in accordance with the magnitude of said fault characteristic value; and supply information limiting means for supplying the detected information about said fault to the information center only when said serious degree exceeds a judgment value;

recovery process instruction means that is installed in the information center to instruct the vehicle to perform a recovery process for eliminating the influence of said fault whose information is supplied to the vehicle;

recovery process execution means that is installed in the vehicle to make the vehicle itself perform the recovery process that is instructed; and process determination means that is installed in the vehicle or in the information center to determine in accordance with the result of said recovery process whether another recovery process should be continued or not.

9. The vehicle fault diagnostic system according to claim 8, wherein said supply information limiting means supplies information including said fault characteristic value to the information center as the information about said fault, and wherein said recovery process instruction means includes urgency judgment means, which, when the information about said fault is supplied from the vehicle, judges in accordance with said fault characteristic value whether the fault should be recognized as an urgent fault; and recovery target limiting means for issuing instructions for performing said recovery process only when said fault whose information is supplied from the vehicle is urgent.

10. The vehicle fault diagnostic system according to claim 7 or 9, further comprising:

identification process instruction means that is installed in the information center to instruct the vehicle to perform a fault identification process for identifying the cause of said fault whose information is supplied from the vehicle;

identification process execution means that is installed in the vehicle to perform the fault identification process that is instructed;

identification process result return means that is installed in the vehicle to return the result of said fault identification process to the information center; and fault location identification means that is installed in the information center to identify a fault location in accordance with the result of said fault identification process, which is returned from the vehicle.

* * * * *